US011082216B2

(12) United States Patent
Bucklew et al.

(10) Patent No.: US 11,082,216 B2
(45) Date of Patent: Aug. 3, 2021

(54) QUANTUM COMMUNICATION SYSTEM HAVING QUANTUM KEY DISTRIBUTION AND USING A MIDPOINT OF THE TALBOT EFFECT IMAGE POSITION AND ASSOCIATED METHODS

(71) Applicant: EAGLE TECHNOLOGY, LLC, Melbourne, FL (US)

(72) Inventors: Victor G. Bucklew, Colorado Springs, CO (US); James A. Nagel, Fort Wayne, IN (US); Brent W. Plansinis, Saint Cloud, FL (US); Michael C. Garrett, Melbourne, FL (US); Timothy C. Burt, Webster, NY (US); Catheryn D. Logan, Melbourne, FL (US); Michael R. Lange, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 99 days.

(21) Appl. No.: 16/668,025

(22) Filed: Oct. 30, 2019

(65) Prior Publication Data

US 2021/0135861 A1    May 6, 2021

(51) Int. Cl.
*H04L 9/08*      (2006.01)
*H04B 10/70*     (2013.01)
(Continued)

(52) U.S. Cl.
CPC ....... *H04L 9/0858* (2013.01); *H04B 10/2581* (2013.01); *H04B 10/516* (2013.01); *H04B 10/66* (2013.01); *H04B 10/70* (2013.01)

(58) Field of Classification Search
None
See application file for complete search history.

(56) References Cited

U.S. PATENT DOCUMENTS

| 7,831,049 B1 | 11/2010 | Kanter |
| 9,306,739 B1 | 4/2016 | Troupe |

(Continued)

FOREIGN PATENT DOCUMENTS

| CN | 101040483 | 9/2007 |
| CN | 107733640 | 2/2018 |

(Continued)

OTHER PUBLICATIONS

Trushechkin et al., "Quantum-Key-Distribution Protocol with Pseudorandom Bases," Phys. Rev. A 97, 012311 (2018), arXiv:1706.00611v1, Jun. 2, 2017, pp. 1-16.

(Continued)

*Primary Examiner* — Jai M Lee
(74) *Attorney, Agent, or Firm* — Allen, Dyer, Doppelt + Gilchrist, P.A.

(57) ABSTRACT

A quantum communications system includes a communications system that operates with a quantum key distribution (QKD) system, which includes a transmitter node, a receiver node, and a quantum communications channel coupling the transmitter node and receiver node. The transmitter node may cooperate with the quantum communications channel defining a Talbot effect image position along the quantum communications channel. The receiver node is located along the quantum communications channel at a midpoint of the Talbot effect image position.

30 Claims, 13 Drawing Sheets

(51) Int. Cl.
*H04B 10/2581* (2013.01)
*H04B 10/66* (2013.01)
*H04B 10/516* (2013.01)

(56) References Cited

U.S. PATENT DOCUMENTS

| | | | |
|---|---|---|---|
| 2003/0002674 | A1 | 1/2003 | Nambu et al. |
| 2007/0064945 | A1 | 3/2007 | Yuan et al. |
| 2016/0233964 | A1 | 8/2016 | Frohlich et al. |
| 2016/0234017 | A1 | 8/2016 | Englund et al. |
| 2016/0234018 | A1* | 8/2016 | Frohlich .............. H04L 9/0852 |
| 2018/0191496 | A1* | 7/2018 | Duplinskiy ........... H04L 9/0855 |
| 2018/0198608 | A1 | 7/2018 | Nordholt et al. |
| 2018/0343116 | A1 | 11/2018 | Nordholt et al. |
| 2019/0323892 | A1* | 10/2019 | Ye ........................... G01J 3/453 |
| 2020/0153619 | A1* | 5/2020 | Ribordy ............... H04L 9/0852 |
| 2020/0274701 | A1 | 8/2020 | Yuan et al. |
| 2021/0099236 | A1* | 4/2021 | Bucklew ............... G02F 1/3534 |

FOREIGN PATENT DOCUMENTS

| | | |
|---|---|---|
| CN | 108599870 | 9/2018 |
| CN | 108809638 | 11/2018 |
| EP | 3185463 | 6/2017 |
| GB | 2559801 | 8/2018 |
| WO | 2012044149 | 4/2012 |
| WO | 2012074369 | 6/2012 |

OTHER PUBLICATIONS

Korzh et al., "Provably Secure and Practical Quantum Key Distribution over 307 km of Optical Fibre," Nature Photonics vol. 9, Jul. 2014, pp. 1-13.
Diamanti et al., "Practical Challenges in Quantum Key Distribution," npj Quantum Information, vol. 2, Article No. 16025, Nov. 2016, pp. 1-12.
Deachapunya et al., "Realization of the Single Photon Talbot Effect with a Spatial Light Modulator," Optical Express 20029, vol. 24, No. 18, Sep. 2016, pp. 1-7.
Song et al., "Experimental Observation of Quantum Talbot Effects," Phys. Rev. Lett. 107, Issue 3, Jul. 2011, pp. 033902-1-033902-4.
Brent W. Plansinis, "Applicaitons of Space-Time Duality," Thesis Paper, The Institute of Optics Arts, Sciences and Engineering Edmund A. Hajim School of Engineering and Applied Sciences, University of Rochester, Rochester, New York, 2017 pp. 1-144.
Plansinis et al., "Single-Pulse Interference Caused by Temporal Reflection at Moving Refractive-Index Boundaries," J. Opt. Soc. Am. B, JOSAB vol. 34 No. 10, Sep. 2017, pp. 2274-2280.
Azaña et al., "Temporal Talbot Effect in Fiber Gratings and its Applications," Appl. Opt., vol. 38 No. 32, (Nov. 1999), pp. 6700-6704
Bucklew et al., U.S. Appl. No. 16/687,767, filed Nov. 19, 2019.
Bucklew et al., U.S. Appl. No. 16/583,346, filed Sep. 26, 2019.
Bucklew et al., U.S. Appl. No. 16/668,002, filed Oct. 30, 2019.
Skoric, B., "Quantum Readout of Physical Unclonable Functions: Remote Authentication without Trusted Readers and Authenticated Quantum Key Exchange without Initial Shared Secrets," (Cryptology ePrint Archive; vol. 2009/369), IACR, 2009, pp. 1-16.
Kent et al., "Secure and Robust Transmission and Verification of Unknown Quantum States in Minkowski Space," Scientific Reports, vol. 4, Article No. 3901, 2014, pp. 1-21.
Goorden et al., "Quantum-Secure Authentication of a Physical Unclonable Key," Optica vol. 1, Issue 6, pp. 421-424.
Bucklew et al., U.S. Appl. No. 16/658,398, filed Oct. 21, 2019.
Bucklew et al., U.S. Appl. No. 17/179,490, filed Feb. 2, 2021.
Barros et al.: "Free-Space Entangled Quantum Carpets," Arxiv.Org. Cornell University Library, 201 Olin Library Cornell University, Ithaca, NY, 14853, DOI: 10.1103/Physreva.95.042311, Feb. 23, 2017, pp. 1-10.
"Quantum Key Distribution; Components and Internal Interfaces," ETSI Draft, QKD05_11_Components_Interfaces, European Telecommunications Standards Institute (ETSI), 650, Route Des Lucioles, F-06921 Sophia-Antipolis, France, Oct. 14, 2009, pp. 1-24.
Farias et al.: "Quantum Information Processing by Weaving Quantum Talbot Carpets," Arxiv.Org. Cornell University Library, 201 Olin Library Cornell University, Ithaca, NY, 14853, DOI: 10.1103/Physreva.91.062328, Dec. 8, 2014 , pp. 1-11.

* cited by examiner

QUANTUM COMMUNICATION SYSTEM HAVING QUANTUM KEY DISTRIBUTION AND USING A MIDPOINT OF THE TALBOT EFFECT IMAGE POSITION AND ASSOCIATED METHODS

FIELD OF THE INVENTION

The present invention relates to communication systems, and, more particularly, to quantum communication systems using quantum key distribution (QKD) and related methods.

BACKGROUND OF THE INVENTION

In a quantum communications system, information is exchanged between a transmitter node and a receiver node using encoded single photons. Each photon carries information that is encoded on a property of the photons, such as its polarization, phase, or energy in time. Quantum key distribution (QKD) allows the sharing of cryptographic keys between the transmitter node, usually referred to as "Alice," and the receiver node, usually referred to as "Bob," allowing a more secure communication between the two parties. The QKD system provides a test whether any part of the key would be known to an unauthorized third party eavesdropper, usually referred to as "Eve." Individual bits of the bit stream are transmitted using single photons. By using complementary properties to which Heisenberg's uncertainty principle applies, information may be encoded into a photon to prevent the unauthorized third party, e.g., "Eve," from monitoring the photon since it would disturb its state. When a secret key is established between the two parties by this QKD system, the two parties may then encrypt data transmitted over any conventional communications channel.

In the QKD system, the two parties as Alice and Bob at the respective transmitter node and receiver node may use two or more non-orthogonal bases to encode bit values. The laws of quantum mechanics apply to the photons and any measurement of the photons by an eavesdropper, e.g., Eve, without prior knowledge of the encoding basis of each photon, causes an unavoidable change to the state of some of the photons. These changes to the states of the photons may cause errors in the bit values sent between the transmitter node and receiver node, and by comparing a part of the common bit steam, the two parties may determine if the eavesdropper, e.g., Eve, has gained information.

Photon polarization is often used to provide the complementary properties for encoding, and is used in the common QKD protocol, BB84, and may be applied to conjugate states such as phase encoding. Other QKD protocols, such as E91, may be based on entanglement of photon pairs and used in a QKD system. The optical path between the transmitter node, e.g., Alice, and the receiver node, e.g., Bob, are connected by a quantum communications channel, which may be free-space or an optical fiber, for example. The transmitter node and receiver node are also each connected to each other via a conventional communications channel, which is used for key exchange or as commonly referred, key sifting.

Each bit of information such as a "0" or "1" may be encoded onto an individual photon by selecting from a pair of orthogonal polarization states. In the BB84 protocol, for example, two pairs of states are used, and each pair of orthogonal states is referred to as a "basis." The Heisenberg uncertainty principle of quantum indeterminacy indicates that the different states cannot in general be measured definitely without disturbing the original state. Also, the "no cloning theorem" indicates that the creation of identical copies of the non-orthogonal states is forbidden.

Two bases are commonly used and provide polarization state pairs in a rectilinear basis of vertical and horizontal polarization, e.g., 0° and 90°, and a diagonal basis, e.g., 45° and 135°. It is possible to use a third circular basis of left-handedness and right-handedness, depending on what other bases are used that are conjugate to each other. Generally, the transmitter node, e.g., Alice, will create a random bit and random basis, and transmit a single photon in the polarization state defined by the bit and basis, and record the time the photon was transmitted over the quantum communications channel. This process is repeated for a string of bits as single photons.

The receiver node, e.g., Bob, will select a basis for measuring each bit and record the time of receipt, the measurement basis, and measurement result for each received bit. Bob will choose from an "agreed upon" pair of bases in which Alice prepares her photons. The receiver node, e.g., Bob, may communicate the basis in which each photon was received, and the transmitter node, e.g., Alice, may communicate the basis in which each photon was transmitted. Communication of basis choice typically will occur after photon receipt. Any bits in which a different basis was used are discarded, leaving the remaining bits as the basis for a shared key. This process is often referred to as key verification or the key sifting phase. A subset of shared bits used by both parties at the respective transmitter and receiver nodes, e.g., Alice and Bob, may be used to check against eavesdropping by an unauthorized third party, e.g., Eve, which would have introduced errors. Different reconciliation and privacy amplification techniques may be used to determine a shared key.

Current cryptographic standards, such as the FIPS 197 encryption as an Advanced Encryption Standard (AES), may ensure security for many types of data. These well-known cryptographic standards, however, may become obsolete as advances occur in quantum computing that allow encryption codes to be broken more readily, as an example, Shor's algorithm related to quantum computer integer factorization. As a result, QKD systems will ensure more secure communication, especially in banking and other communications that require high security and efficient cryptographic standards.

Current QKD systems may tolerate a maximum quantum bit error rate (QBER) of about 15% before the QKD system fails and as a result, a secure cryptographic key cannot be obtained. The QBER is indicative of the amount of information that the eavesdropper "Eve" could possess. The QBER, however, is also a measure of the environmental effects, such as channel loss, turbulence and pointing errors. To ensure security, the transmitter node, e.g., "Alice," and receiver node, e.g., "Bob," will assume that the entire QBER is the result of an eavesdropper, e.g., Eve. Problems in this approach arise because many communication environments have an inherently high QBER, which may preclude the reliable use of standard QKD protocols because the baseline QBER may be too high for a secure key exchange. Increasing the maximum tolerable QBER threshold is thus important for increasing the length of the quantum communications channel, for relaxing equipment specifications in existing communication links, for implementing QKD in high loss, SWaP efficient, chip-fiber based systems, and for enabling QKD in highly contested and turbulent communication links.

SUMMARY OF THE INVENTION

In general, a quantum communications system may include a communications system operative with a quantum key distribution (QKD) system, which includes a transmitter node, a receiver node, and a quantum communications channel coupling the transmitter node and receiver node. The transmitter node may cooperate with the quantum communications channel defining a Talbot effect image position along the quantum communications channel. The receiver node may be located along the quantum communications channel at a midpoint of the Talbot effect image position.

The transmitter node may be configured to generate temporally modulated photons. The receiver node may comprise a phase detector. The receiver node may comprise at least one single photon detector. The quantum communications channel may comprise a single mode optical fiber. The temporally modulated photons each have a transmitted quantum basis, and the receiver node is configured to sift for bits obtained by measurement in the basis opposite that in which the photon was prepared.

The transmitter node may be configured to generate spatially modulated photons. The quantum communications channel may comprise a multi-mode optical fiber. The spatially modulated photons may have a transmitted quantum basis, and the receiver node may be configured to sift for bits obtained by measurement in the basis opposite that in which the photon was prepared. The transmitter node may be configured to perform optical polarization encoding.

Another aspect is directed to a method of operating a quantum communications system that may comprise a communications system and a quantum key distribution (QKD) system operable therewith. The QKD system may comprise a transmitter node, a receiver node, and a quantum communications channel coupling the transmitter node and receiver node. The method may comprise operating the transmitter node to cooperate with the quantum communications channel to define a Talbot effect image position along the quantum communications channel and operating the receiver node to be located along a midpoint of the quantum communications channel at the Talbot effect image position.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete.

Figure 1:
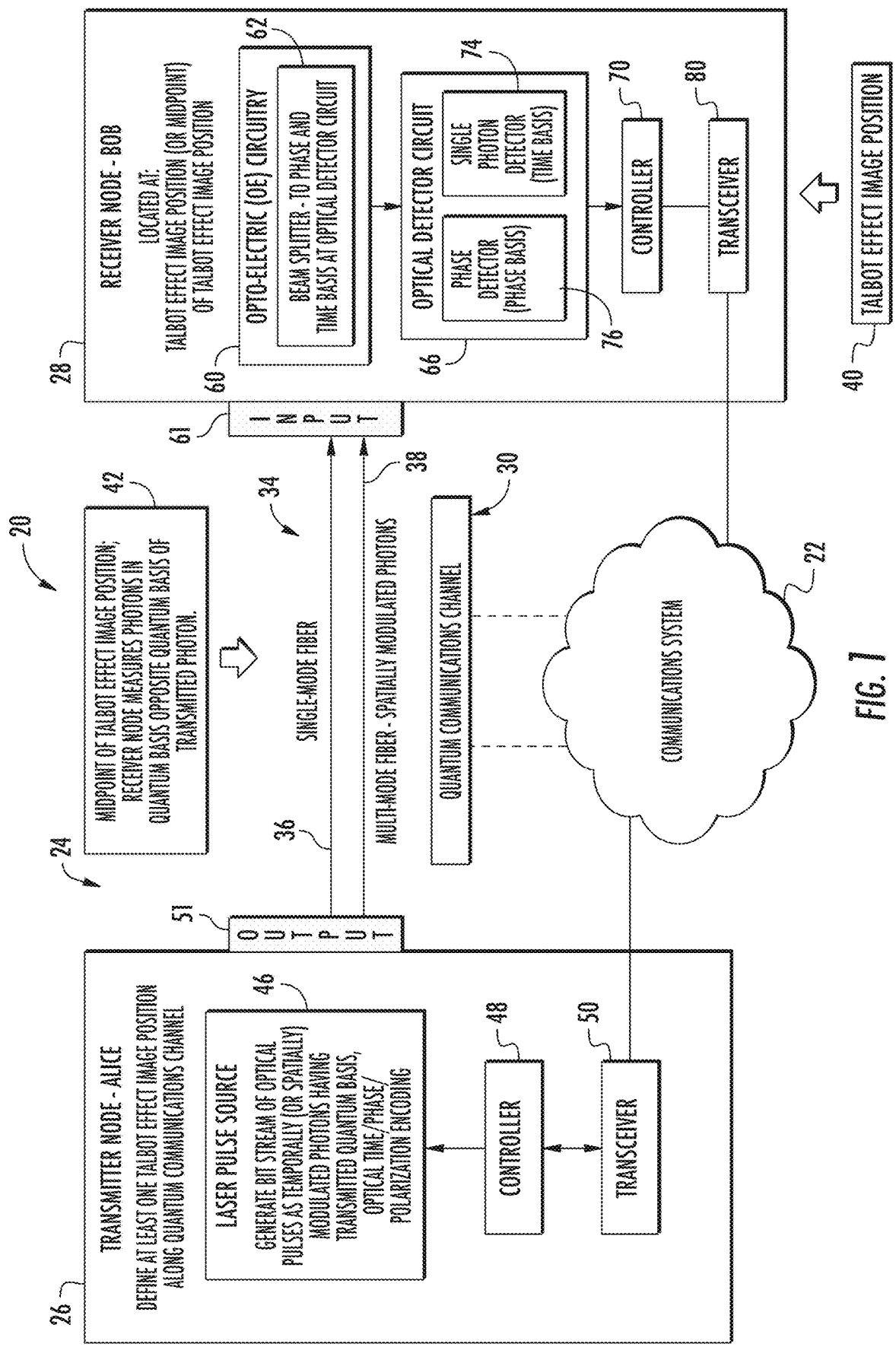
FIG. 1 is a block diagram of the quantum communications system according to the invention.

Referring initially to FIG. 1, a quantum communications system is illustrated generally at 20 and includes a communications system 22 as a non-quantum communications system and a quantum key distribution (QKD) system 24 operable with the communications system. The QKD system 24 includes a transmitter node 26 referred to as Alice, a receiver node 28 referred to as Bob, and a quantum communications channel 30 coupling the transmitter node and receiver node.

In an example, the quantum communications channel 30 may include a fiber optic communications channel 34 that is formed as a single mode optical fiber 36, in an example, and in an another example, it may be formed as a multi-mode fiber 38. The single mode optical fiber 36 may be used for transmitting temporally modulated photons and the multi-mode optical fiber may be used for transmitting spatially modulated photons. The quantum communications channel 30 may include a free-space optical (FSO) communications channel such as by satellite or line-of-sight. The transmitter node 26 may cooperate with the quantum communications channel 30 and define at least one Talbot effect image position 40 along the quantum communications channel 30. The receiver node 28 may be located along the quantum communications channel 30 at the at least one Talbot effect image position 40 in an example, and in yet another example, the receiver node may be located along the quantum communications channel 30 at the midpoint of the Talbot effect image position as designated at 42. When the receiver node 28 is located at the midpoint 42, a different communications protocol may be used where the receiver node 28 measures photons in the quantum basis opposite the quantum basis of the transmitted photon as explained in greater detail below. This communication is also referred to as the flipped basis protocol in the description below.

As known to those skilled in the art, the Talbot effect is a near-field diffraction effect. An image results from the optical pulses passing through optical transmitter components, such as an optical grating and spatial light modulator. An image is formed that is repeated at regular distances, called the Talbot length or Talbot effect image position, while repeated images are called self-images or Talbot images. At the half distance of that Talbot length, or the midpoint of the Talbot length, a self-image occurs, but it is phase shifted by half a period. For this reason, in the quantum communications system 20 of FIG. 1, the receiver node 28 may also be positioned at the midpoint 42 of the Talbot effect image position 40 and when at the midpoint, the flipped basis protocol for QKD as explained in greater detail below is employed.

In an example, the transmitter node 26 may be configured to generate temporally modulated photons that are communicated over the single mode optical fiber 36. The transmitter node 26 may also be configured to generate spatially modulated photons that are transmitted over the multi-mode optical fiber 38.

When the receiver node 28 as Bob is located along the quantum communications channel 30 at a midpoint 42 of the Talbot effect image position, the transmitter node 26 may generate temporally modulated photons such as using optical polarization encoding. Each photon has a transmitted quantum basis and the receiver node 26 measures each photon in a quantum basis opposite the quantum basis of the photon as transmitted as part of the flipped basis protocol. When the transmitter node 26 generates spatially modulated photons, the spatially modulated photons have a transmitted quantum basis. When the receiver node 28 is located at the midpoint 42 of the Talbot effect image position, the receiver node measures each photon in a quantum basis opposite the quantum basis of the photon as transmitted even when spatially modulated, as will be explained in greater detail below.

The transmitter node 26 communicates with the receiver node 28 over the quantum communications channel 30. Both nodes 26,28 may communicate via the communications system 22, which may include a non-quantum or conventional communications channel and may be fiber optic, free-space, wired, or another communications channel. The quantum communications channel 30 may be part of the communication system 22 as indicated by the dashed lines connecting the two, indicating that both the quantum communications and non-quantum communications may be transmitted over the fiber optic communications channel 34 as part of the communications system 22.

When describing a quantum communications systems 20, the transmitter node 26 is usually referred to as "Alice" and the receiver node 28 is usually referred to as "Bob." In this description, the terms "transmitter node 26" and "Alice" are interchangeable and both may be used in this description and are given the reference numeral 26. The terms "receiver node 28" and "Bob" are interchangeable in this description and both are given the reference numeral 28. Any eavesdropper on the quantum communications system 20 is usually referred to as "Eve" and may be located anywhere on the public section forming the communications link in the quantum communications channel 30. The transmitter node 26 may include a laser pulse source 46 for generating a bit stream of optical pulses. Although a laser pulse source 46 is described, it should be understood that other sources of the optical pulses may be used that generate the bit stream of optical pulses. It is possible depending on system design for one or more light emitting diodes (LED's) to be used to generate the bit stream of optical pulses.

The optical pulse output from the transmitter node 26 is an output bit stream of photons that are encoded bit values. The photons may be temporally or spatially modulated photons and have a transmitted quantum basis that includes time and phase parameters, including optical polarization encoding. The photon polarization provides the complementary property used for encoding purposes, such as in the QKD protocol, BB84, and may be applied to conjugate states such as phase encoding. Other protocols, such as the E91 protocol, may be used that includes the entanglement of photon pairs. Each bit of information such as a "0" or "1" may be encoded onto an individual photon by selecting from a pair of orthogonal polarization states. In the BB84 QKD protocol, two pairs of orthogonal states are used, and each pair of orthogonal states is referred to as a "basis." The bases provide polarization state pairs in a rectilinear basis having vertical and horizontal polarization, such as 0° and 90°, and a diagonal basis having opposite diagonal direction polarization, such as 45° and 135°. It is also possible to use a circular basis of left-handedness and right-handedness depending on what other bases are used that are conjugate to each other.

The transmitter node 26 includes a controller 48, which may include a random number generator, operatively connected to the laser pulse source 46 and other components at the transmitter node for controlling their operation, such that the laser pulse source is controlled for transmitting a photon in a polarization state defined by the bit and basis, and record the time the photon was transmitted. This process is repeated for the string of bits as a stream of photons. The transmitter node 26 may include a transceiver 50 connected to the controller 48 and operative to communicate with the receiver node 28 via the communications system 22 using, for example, an unencrypted non-quantum communications channel for the key exchange or key sifting process, as the key exchange is commonly called.

The transmitter node 26 transmits the bit stream of optical pulses via its output 51 over the quantum communications channel 30, such as the fiber optic communications channel 34, and as either separate or a part of the communications system 22, and either as temporally modulated photons or spatially modulated photons in an example. It is possible to use the same optical fiber for both quantum communications and conventional communications for key exchange, such as unencrypted communications used in key sifting.

The receiver node 28 may include receiver opto-electronic (OE) circuitry 60 that receives via an input 61 the bit stream of optical pulses from the transmitter node 26 over the quantum communications channel 30. This OE circuitry 60 may include a beam splitter 62 for splitting the optical signal into optical phase or time streams for measurement in the phase basis or time basis as explained below. An optical detector circuit 66 receives the bit stream of optical pulses from the OE circuitry 60 and detects the optical pulses and generates signals that may be processed at a controller 70, which processes and demodulates the signals representative of the optical pulses depending on the communications protocol. At the receiver node 28, the optical detector circuit 66 may be formed as a single photon detector 74 for measuring photons in the time basis, and in an example, an array of single photon detectors, and a phase detector 76 for measuring the photons in the phase basis.

The controller 70 at the receiver node 28 may be connected to a conventional transceiver 80, also located at the receiver node 28. This transceiver 80 may communicate via the conventional or non-quantum communication system 22 with the transceiver 50 located at the transmitter node 26. For example, Bob as the party at the receiver node 28 may communicate with Alice as the party at the transmitter node 26 over the conventional communications system 22, and transmit data regarding the basis in which each photon was received at the receiver node 28. The transmitter node 26, e.g., Alice, may transmit data about the basis in which each photon was transmitted to the receiver node 28, e.g., Bob, using the conventional communication system 22. Any bits having a different basis may be discarded, leaving the remaining bits as the basis for a shared cryptographic key in the key verification or key sifting phase. The subset of shared bits used by both parties, e.g., Alice and Bob, as to the respective transmitter and receiver nodes 26, 28, may be used to check against eavesdropping by the unauthorized party, e.g., Eve, which would have introduced errors into the communications stream of bits.

The transmitter node 26 may include other components not illustrated in detail, such as a spatial light modulator (SLM) that imposes a spatially varying modulation by modulating intensity and phase, a waveguide array that increases bit generation and phase bin states, and an attenuation filter. These components may be used to transmit temporally modulated photons or spatially modulated photons and perform optical polarization encoding. The OE circuitry 60 at the receiver node 28 includes the beam splitter 62 to split any incoming optical pulse streams for time processing and phase processing as explained in greater detail below. The optical detector circuit 72 includes the phase detector 76 and single photon detector 74 for phase basis and time basis measurements, respectively.

Figure 2:
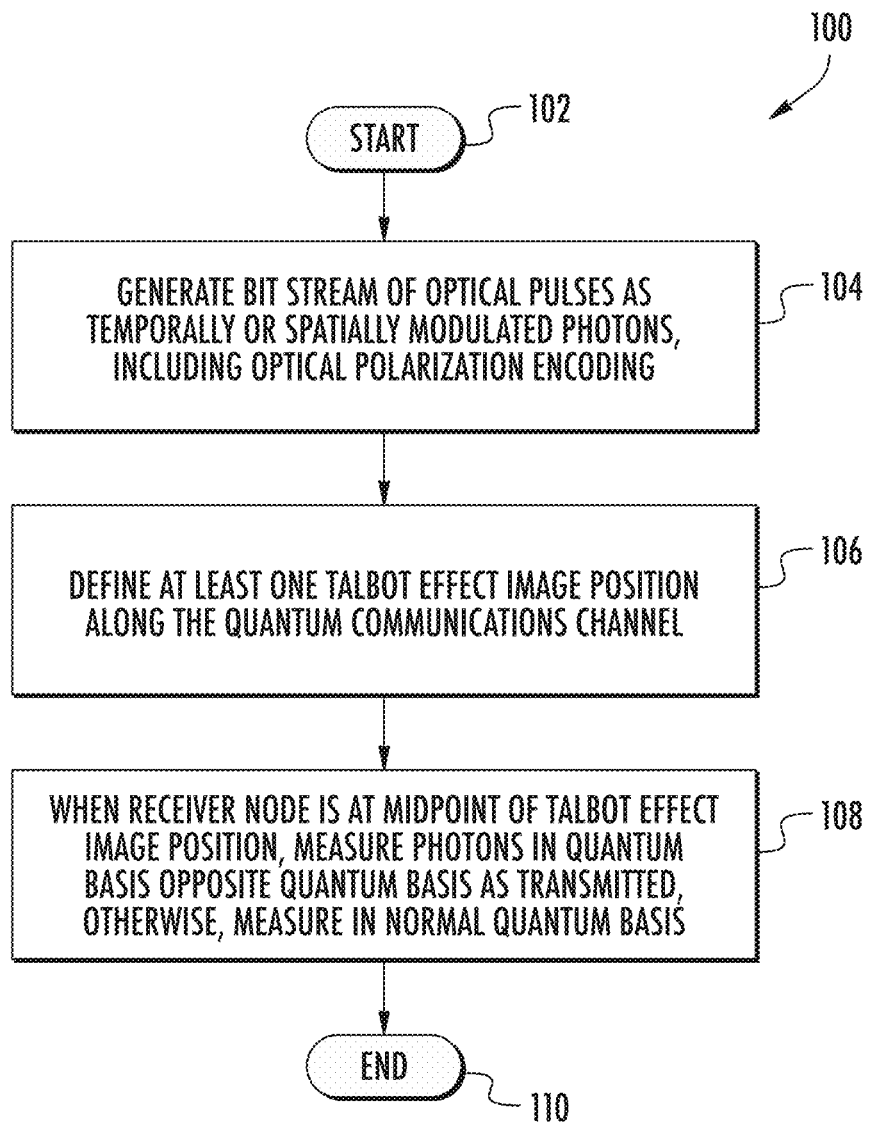
FIG. 2 is a high-level flowchart of a method for operating the quantum communications system of FIG. 1.

A flowchart illustrating the method of operating the quantum communications system is illustrated in FIG. 2 at 100. The process starts (Block 102) and the laser pulse source 40 at the transmitter node 26 generates a bit stream of optical pulses, which may be temporally or spatially modulated photons and include optical polarization encoding (Block 104). The transmitter node 26 defines at least one Talbot effect position along the quantum communications channel 30 (Block 106). If the receiver node 28 is located at the midpoint 42 of the Talbot effect image position, photons are measured in a quantum basis opposite as transmitted, otherwise the normal quantum basis is measured (Block 108). What changes is the sifting procedure, i.e., in the midpoint case, the bits are kept when preparation and measure bases are "opposite." The process ends (Block 110).

There now follows greater details of the quantum communications system 20 and how the quantum communications system 20 employs single photon self-interference, achieved through the quantum Talbot effect, to bridge performance gaps in the quantum communication channel 30 that exist with conventional QKD systems. Based on single photon self-interference achieved through the quantum Talbot effect, the quantum communications system 30 may reduce the mutual information between Eve and Bob 28 at the receiver node, and Eve and Alice 26 at the transmitter node. Developing a high performance QKD protocol that can tolerate a high QBER while remaining secure allows the quantum communications system 20 to operate successfully in demanding high loss communication links where the QBER of more conventional QKD system is currently too high for reliable operation. For many conventional QKD systems, unconditionally secure quantum key transmission between Alice 26 and Bob 28 is dependent on the mutual information between Alice and Bob being greater than the mutual information between Eve and Alice, or between Eve and Bob.

Generally, a photon is prepared in an eigenstate $|\Psi\rangle$ of a particular basis and transmitted from the transmitter node as Alice 26 over the quantum communications channel 30 to the receiver node as Bob 28. In conventional QKD systems, if the eigenstate $|\Psi\rangle$ was prepared in the same photon basis that Eve or Bob 28 chooses to measure the quantum state in, both will measure the same state that Alice 26 initially prepared. However, in a conventional QKD system and associated conventional QKD protocols, for a d=2 data structure, if Eve or Bob 28 choose a different basis than the one Alice 26 initially prepared the quantum state in, both would collapse the eigenstate $|\Psi\rangle$ into one of the eigenstates of the basis they were measuring in, and would have a 50% chance, corresponding to a random guess, of correctly identifying the associated bit value of the state that Alice sent. This may occur if the "different basis" is mutually unbiased. This use of mutually unbiased bases, and the impact of preparing and measuring in inconsistent bases, is used to establish a QKD protocol for the quantum communications system 20 allowing a secure communication link between Alice 26 and Bob 28. As Eve is forced to annihilate the state Alice 26 has prepared as a single photon in order to gain any information about it, and as Eve must randomly choose a basis to measure the state in, on average Eve will choose the wrong basis 50% of the time, both resulting in measurements which do not provide Eve information about the original state, and revealing Eve's presence to Bob 28 downstream through a quantum bit error rate (QBER) that is higher than a certain threshold value.

It is generally assumed that the eigenstate $|\Psi\rangle$ prepared in a particular basis, does not change as it propagates. Thus, If Eve and Bob 28 choose the same basis to measure the state that Alice 26 initially used to prepare the state in, Eve and Bob will both measure it accurately. For a 4-state QKD protocol, however, such as two bases, each spanned by two eigenstates, Eve has on average a 75% chance of correctly retrieving the bit value that Alice 26 sends, as she has a 50% chance of correctly choosing the correct basis (and 100% accuracy of retrieving the associated bit value in the correct basis), and a 50% chance of choosing the wrong basis (and a 50% accuracy of retrieving the associated bit value when measuring in the wrong basis). The amount of error that Bob 28 can tolerate before knowing that the quantum communications channel 30 is insecure and that Eve is present, is in part dependent on this probability, which essentially reflects the amount of information that Eve has access to.

Increasing the maximum threshold of the quantum bit error rate (QBER) that Bob 28 can tolerate before concluding that the quantum communications channel 30 is not unconditionally secure may increase secure link lengths, increase secure bit rates, and enable more efficient and cost effective implementations of the quantum communications system 20 in existing communication links and enable a secure QKD in previously unattainable high loss chip based architectures or high loss field applications.

The quantum communications system 20 may increase the maximum QBER threshold of QKD protocols, where an initial state |Ψ⟩ evolves nonlinearly within the segment of public link of the quantum communications channel 30 that Eve has access to, as opposed to the linear evolution in conventional QKD protocols, between Alice 26 and Bob 28, so that any measurements made at a location other than where Alice 26 and Bob 28 are located will reduce the information available to Eve, even if Eve chooses to measure |Ψ⟩ in the same basis that the state was initially prepared in. The quantum communications system 20 may reduce Eve's information about the eigenstate |Ψ⟩ in the public segment of the quantum communications channel 30 even for measurements she conducts in the correct basis. The QBER threshold required for unconditional security may be increased even when Eve chooses the right basis. The probability that Eve will measure the state Alice 26 initially sent is reduced when compared with conventional QKD systems. As a result, using the quantum communications system 20 of FIG. 1, Alice 26 and Bob 28 may tolerate higher system losses, increase communication link distances, relax optical detector requirements, and adapt into existing telecom networks, while still maintaining net positive secret key rates.

Figure 3:
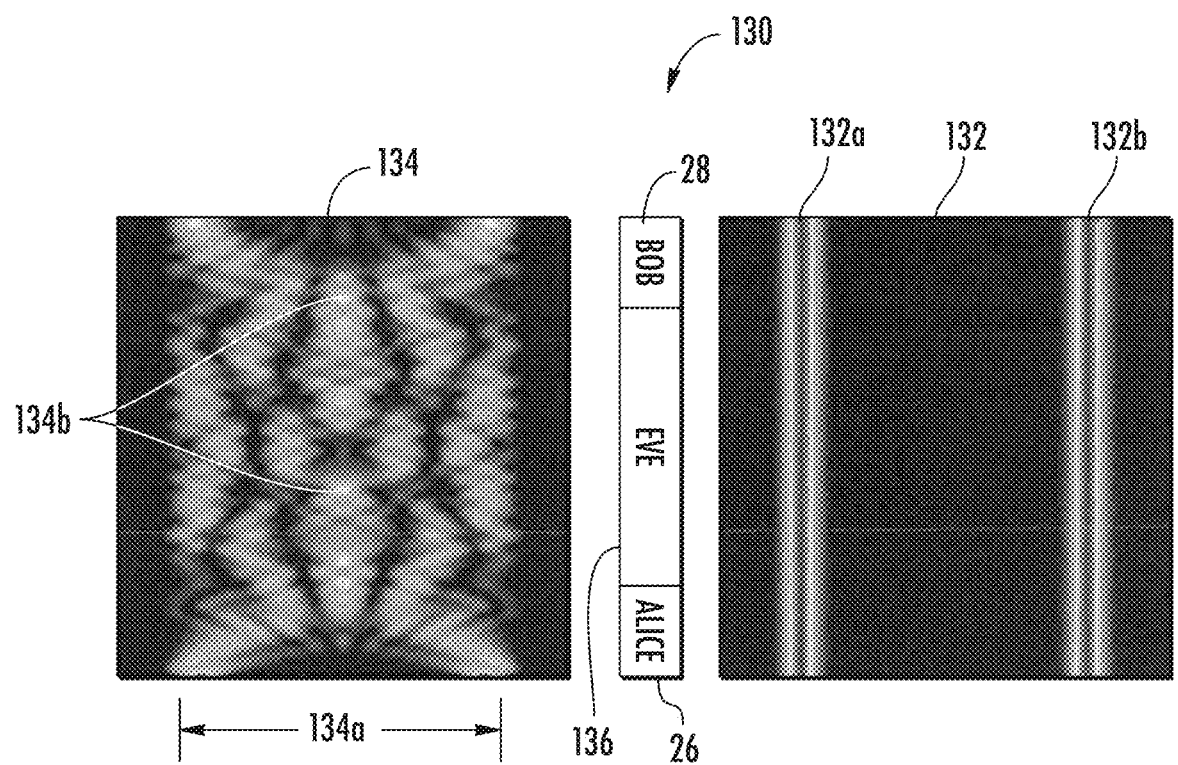
FIG. 3 are images comparing optical pulse propagation in a conventional quantum key distribution (QKD) system and the quantum communications system of FIG. 1.

Referring now to FIG. 3, two optical pulse propagation images are shown generally at 130 for a conventional QKD system 132 on the right and showing two narrow optical pulse transmission bands 132a and 132b, corresponding to the outer waveguide such as a single mode optical fiber. The optical pulse propagation image 134 on the left is for the quantum communications system 20 and shows the spread probability density within the waveguide between the lines at 134a with the Talbot effect image positions formed as indicated at 134b. The lower section of the images corresponds to Alice 26, and the middle "public" area has Eve indicated at 136, located anywhere in that public link within the quantum communications channel 30. Bob 28 is at the top. Hereinafter, Eve will be referred to by the reference numeral 136. In the image 134 for the quantum communications system 20 shown in the left, even if the correct basis is chosen by all parties, the information about the quantum state that is available to Eve may be less than the information that is available to Alice 26 and Bob 28, thus providing performance enhancements, as compared to the image 132 of the conventional QKD system shown on the right. The information has been made less easily accessible by Eve. She would at the very least need to expand her basis set.

As the QBER increases, for example, in the d=2 BB84 protocol, the ratio of the final cryptographic key length to the sifted key length decreases to near 0%. This occurs because more of the sifted bits need to be sacrificed for privacy amplification the higher the QBER is, in order to ensure that Eve 136 does not have information about the secret key that Alice 26 and Bob 28 ultimately distill. The threshold QBER for a d=2 QKD protocol is near 15%, and represents the maximum error that a conventional QKD system can tolerate and still transmit a net positive secure data stream. The quantum communications system 20 as described uses a nonlinear evolution in the public communications link where Eve 136 may be located, which may increase the threshold QBER, and allow implementation in lossy field applications and in longer communication links.

It is possible to model the quantum communications system 20 where a photon in an eigenstate |Ψ⟩ undergoes a nonlinear transition during transmission from Alice 26 to Bob 28. The temporal and spectral properties of the photon may be analyzed as time binned photons, which can be more robustly detected as compared to other quantum state variables such as polarization and orbital angular momentum (OAM) of light. The quantum communications system 20 may account for dispersion of the single photon and nonlinear phase effects. Nonlinear phase accumulation due to the self-phase modulation that the photon imparts on itself is small, but is still included in the description. The quantum communications system 20 may account for the impact of cross phase modulation on the single photon, imparted by one or more co-propagating pump pulses. The two governing equations describing the temporal evolution as a temporally modulated photon of the single photon and pump pulses are shown below where "p" and "q" designate the pump and single photon, respectively:

$$\frac{dA_p(z,t)}{dz} = i\frac{\beta_p}{2}\frac{d^2 A_p(z,t)}{dt^2} - i\gamma \left|A_p(z,t)\right|^2 A_p(z,t) - i2\gamma \left|A_q(z,t)\right|^2 A_p(z,t)$$

$$\frac{dA_q(z,t)}{dz} = i\frac{\beta_q}{2}\frac{d^2 A_q(z,t)}{dt^2} - i\gamma \left|A_q(z,t)\right|^2 A_q(z,t) - i2\gamma \left|A_p(z,t)\right|^2 A_q(z,t).$$

These equations describe coupled and extended nonlinear Schrodinger (NLSE) equations for a pump $A_p$ as a laser pulse source 46 and a photon $A_q$ describing the temporal evolution of the two waves as they propagate a distance "z" down an optical fiber 34 as the quantum communications channel 30.

In modeling and simulation, it is possible to use a split step Fourier algorithm, where the dispersion operator is solved in the frequency domain, and a nonlinear operator is solved in the time domain. It is possible to implement a fourth order Runge Kutta operator to solve for the nonlinear operator. Provided that step sizes are small enough to minimize the nonlinear phase accumulation in each step, the split step algorithm models the temporal evolution of an ultrafast optical mode.

A simulation was performed that modeled the dispersive and nonlinear effects and propagation of a theoretically predicted optical soliton through a length of 100 meters of optical fiber, where the optical field did not change during propagation. For a correct numerical implementation of these governing equations, the initial soliton should not change temporal or spectral shape as it propagates, since the dispersive and nonlinear phases will balance each other as shown in FIGS. 4A and 4B, where the optical pulse images for the soliton propagation are shown, considering a center wavelength of about 1550 nm, a pulse width of about 1 ps, a pulse energy of about 51 pJ, a link length of about 100 m with SMF28, a GVD of about −0.02 ps^2/m, and a gamma of about 0.00143 rad/m.

Figure 4B:
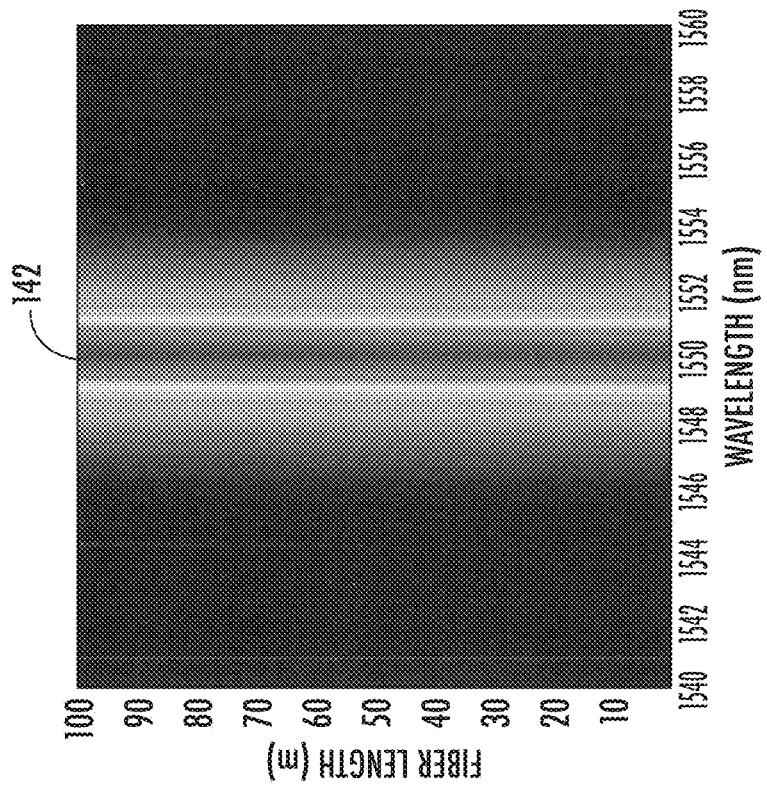
FIG. 4B is an image of soliton propagation for the optical pulse in the frequency domain evolution.
Figure 4A:
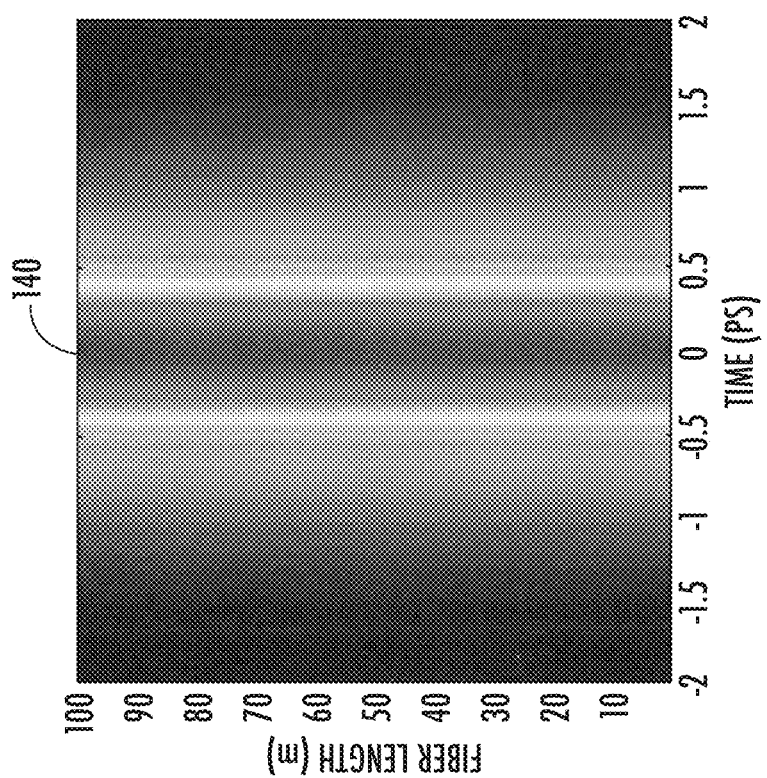
FIG. 4A is an image of soliton propagation for the optical pulse in the time domain evolution.

Both FIGS. 4A and 4B have the fiber length in meters on the vertical axis. The time domain evolution is shown in FIG. 4A at 140 with the time in picoseconds on the horizontal axis, as compared to the frequency domain evolution shown in FIG. 4B at 142 with the wavelength in nanometers (nm) on the horizontal axis. It is evident that the time domain 140 extends about −0.5 to 0.5 (FIG. 4A) and the frequency domain 142 extends in a wavelength spread of about 1548 nm to 1552 nm (FIG. 4B). However, for even small changes in the energy or temporal width of the optical pulse, it may accrue nonlinear and dispersive phases in different magnitudes for the same propagation distance and will not remain invariant as it propagates.

The quantum communications system 20 of FIG. 1 may use the Talbot effect as applied to single photon imaging. The quantum communications system 20 reduces the probability that Eve 136 correctly detects the state |Ψ⟩ that Alice 26 sends to Bob 28, even if Eve correctly identifies the basis that the state |Ψ⟩ was prepared in. The quantum communications system 20 makes use of single photon self-interference on the probability distribution function of the photon. The probability distribution function of the photon is broadly distributed and smoothed out from the initial state, whereas at the receiver node 28 for Bob, the probability distribution function is well localized to the measurement bin that Alice 26 initially prepared the photon in. Thus, Bob has a greater probability than Eve 136 of correctly determining the bit value that Alice 26 was trying to send. This is obtained via the quantum communications system 20 using the Talbot effect image position in waveguides.

The Talbot effect references a particular evolution of the spatial or temporal optical field within a waveguide, e.g., single mode fiber 36 or multi-mode fiber 38. If the optical field is symmetric about the waveguide boundaries, and it is not an eigenmode of the waveguide, diffraction or dispersion for the respective spatial or temporal mode will cause the mode to spread. Once the mode reaches the waveguide boundary, it reflects, and forms a virtual image of the initial state. This process continues, where virtual images with particular phase displacements relative to each other are generated. These virtual images continuously interfere with each other as they propagate down the waveguide. For particular integer multiples of the Talbot distance, these images come together with the correct relative phases to reconstruct the original optical field.

When the receiver node as Bob 28 is positioned at the Talbot reimaging distance also termed the Talbot effect image position 40 (FIG. 1), any measurement Bob makes would provide more information about the photon state Alice 26 initially sent, than a similar measurement, i.e., in the same basis made by Eve 136 anywhere else in the public area of the quantum communications channel 30.

Figure 5:
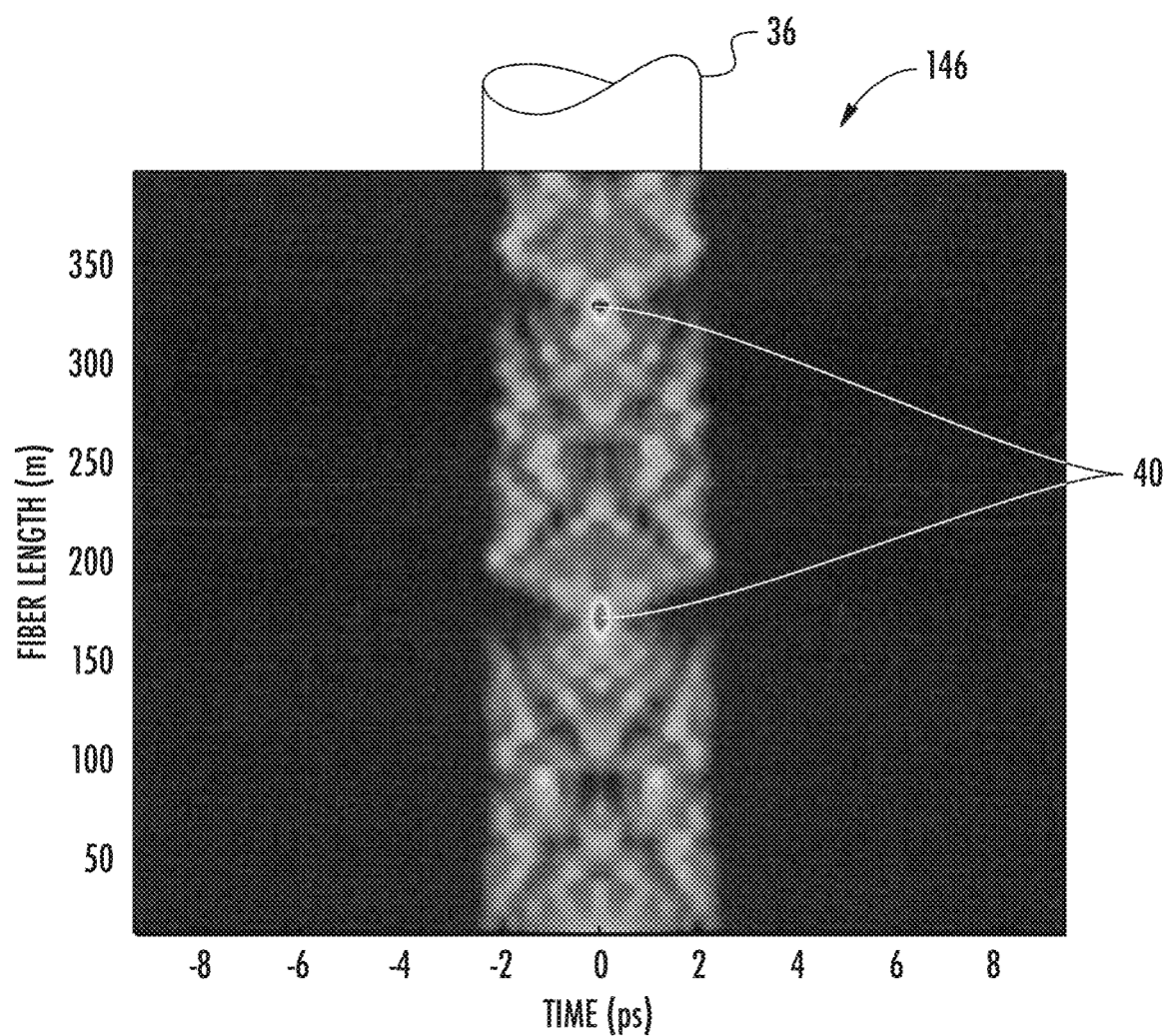
FIG. 5 is an image showing an example of Talbot effect image positions along a waveguide.

The quantum communications system 20 makes use of the Talbot effect at the single photon level, where the spatial or temporal mode structures are no longer the field amplitudes in time or space, but are now the probability distribution functions in space or time. As shown in the optical pulse propagation image 146 for the time domain evolution for a single photon in FIG. 5, the Talbot effect image positions are illustrated at 40, corresponding to the location in the optical communications system 20 in FIG. 1. For those locations along the waveguide not at the Talbot effect image position 40, the single photon probability distribution function expands to include the entire width of the waveguide, which for purposes of explanation is shown diagrammatically at 36, corresponding in this example to a single mode optical fiber. This image of the optical pulse propagation in the time domain evolution of FIG. 5 is an example of the Talbot effect in a temporal waveguide, and in this case, by injecting a 1 ps FWHM single photon energy pulse into the temporal waveguide, formed by two co-propagating ~200 fs FWHM soliton pulses, separated temporally by 5 ps. The fiber length in meters is shown on the vertical axis and the time in picoseconds is shown on the horizontal axis. As the single photon pulse propagates, virtual images of the photon form and interfere, resulting in a much broader temporal probability distribution function of the single photon.

At the Talbot image point corresponding to the Talbot effect image position, and integer multiples of it illustrated at 10 in the optical pulse propagation image of FIG. 5, the initial field is re-constructed. The quantum communications system 20 uses a protocol where measurement bins, e.g., time bins, fill the window of a waveguide, and then launch an initial state within one measurement bin. As the optical pulse propagates, the pulse will fill other measurement bins with a spatially varying probability amplitude. As a result, any measurement not made at the Talbot effect image position 40 or integer multiples will contain some probability of the state being in a measurement bin that it was not initially prepared in. However, at the Talbot effect image position 40 or integer multiples, the measurement will faithfully reveal the state of the original wave function. In the quantum communications system 20, the information available to Eve 136 for the two bases that Alice 26 prepares the states in, may be less than the information available to Bob 28, especially if they both choose to measure in the bases that Alice originally prepared the state in. It is possible to reduce Eve's 136 information to a random guess with less information than conventional QKD systems, while also increasing by double Eve's visibility with 100% visibility for a "d" dimensional data structure. This is only known for certain if Eve is restricted to measurements in the two-basis subset used by Alice and Bob. This results in the quantum communications system 20 tolerating a higher QBER threshold, which enables the quantum communications system 20 to be used in higher loss environments or operated over longer link lengths.

The quantum communications system 20 uses a QKD protocol compatible with Talbot reimaging, for example, on top of a time-phase QKD 2-basis, 4-state "prepare and measure" protocol. To mitigate initial risk, it is possible to overlay the nonlinear evolution on top of an already established QKD security protocol, so that the QKD protocol will be secure and offer additional performance enhancements, including use with quantum sensing applications.

Figure 6A:
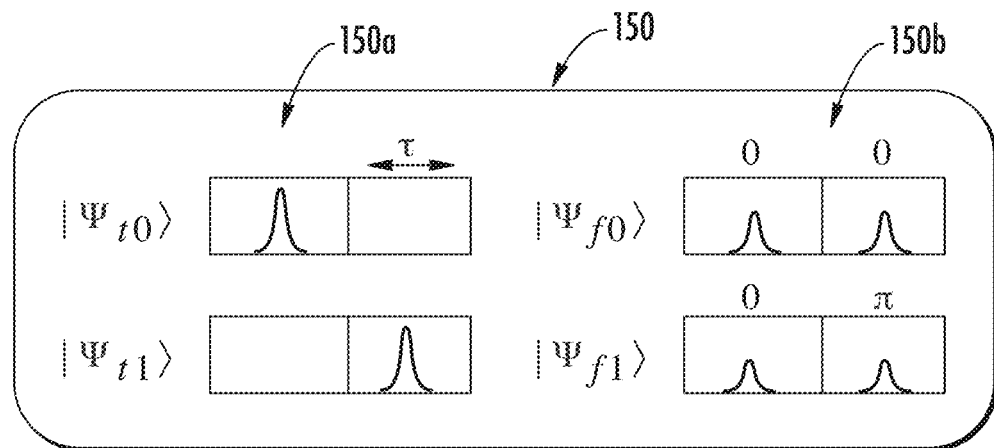
FIG. 6A is a schematic diagram showing time and phase basis states in a conventional QKD system.
Figure 6B:
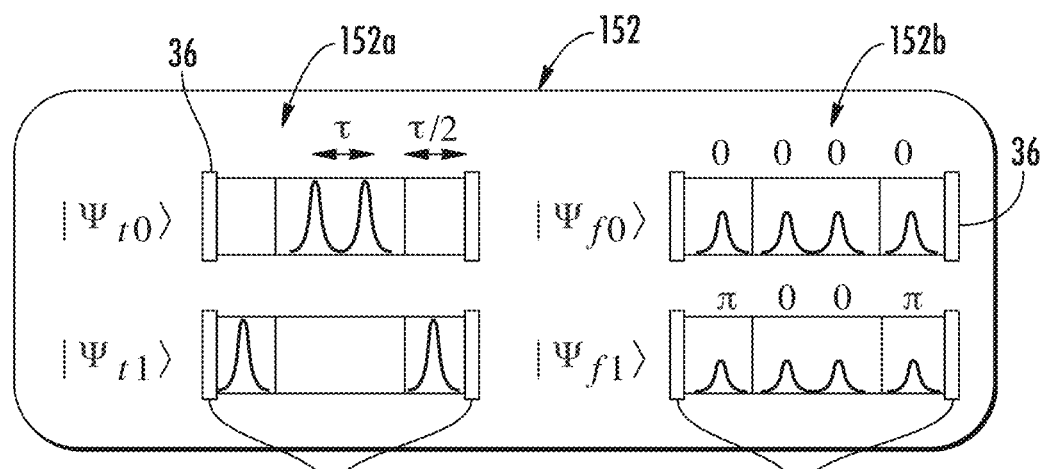
FIG. 6B is a schematic diagram showing time and phase basis states in the quantum communications system of FIG. 1.

The quantum communications system 20 may form time and phase basis states such that two orthogonal eigenstates in any one basis are projected into mutually unbiased basis states and are indiscriminate as the function, which is an implicit part of the security of d=2 protocols. The quantum states are conducive with the requirement for Talbot imaging such that the eigenstates of each basis are symmetric about the waveguide boundaries. This can be accomplished by modifying the standard time-phase data encoding structures. For example, in FIG. 6A, the data encoding structures 150 for the standard time and phase basis states are shown respectively at 150a and 150b in a conventional QKD system. The time spacing between each bin is T. The quantum communications system 20 of FIG. 1, on the other hand, has time-phase basis eigenstates that are compatible with the Talbot effect and symmetric about the waveguide boundaries, but which are also indiscriminate from each other when represented in a mutually unbiased basis as shown by the data encoding structures at 152 in FIG. 6B with the time and phase basis states shown respectively at 152a and 152b. The time width of the central bin is t, and the time spacing of the two adjacent bins is τ/2.

Figure 7:
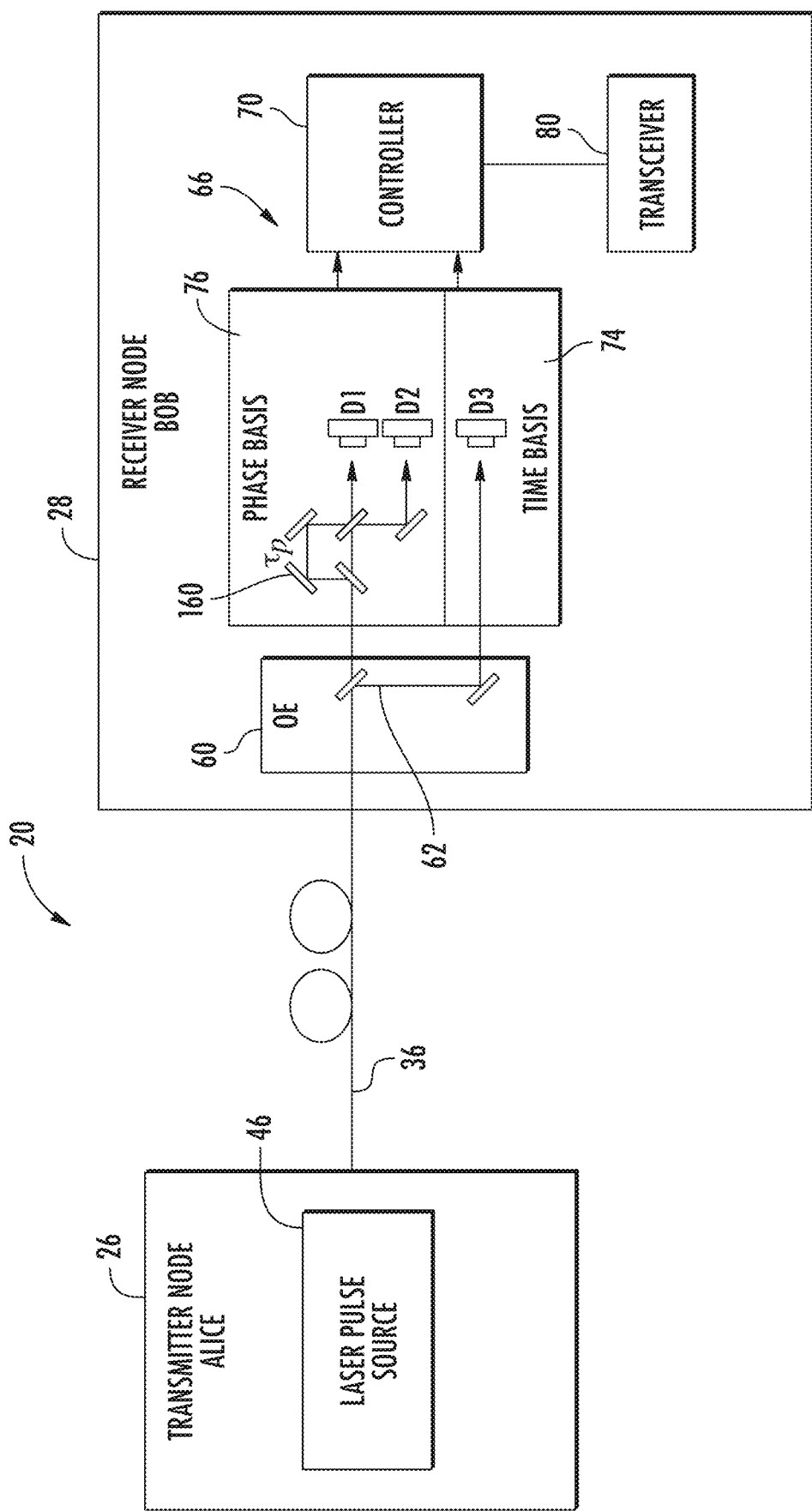
FIG. 7 is a schematic block diagram of the quantum communications system of FIG. 1 showing phase and time basis detectors at the receiver node.

Further details of pulse detection occurring at the receiver node 28 are explained relative to FIG. 7, where a more general schematic block diagram is illustrated, and showing the optical detector circuit 66 having a phase basis section as part of the phase detector 76, which includes detectors D1 and D2 for phase basis measurements, and in this example, a single photon detector 74 for time basis measurements and including detector D3. The quantum communications system 20 results in the correct determination of the state for the quantum basis it is intended to be measured in, and random results of the state when measured in an incorrect basis. As shown in FIG. 7, the phase-basis detector 76 includes detectors D1 and D2, and the single photon detector 74 includes detector D3.

An incoming photon may be randomly directed by the beam splitter 62 to either a time basis measurement at the single photon detector 74 (D3) or a phase basis measurement at the phase detector 76 (D1 and D2). For time basis measurements, detector D3 as the single photon detector 74 detects the arrival time of the photon, which correlates with a particular time bin and associated bit value.

Figure 8:
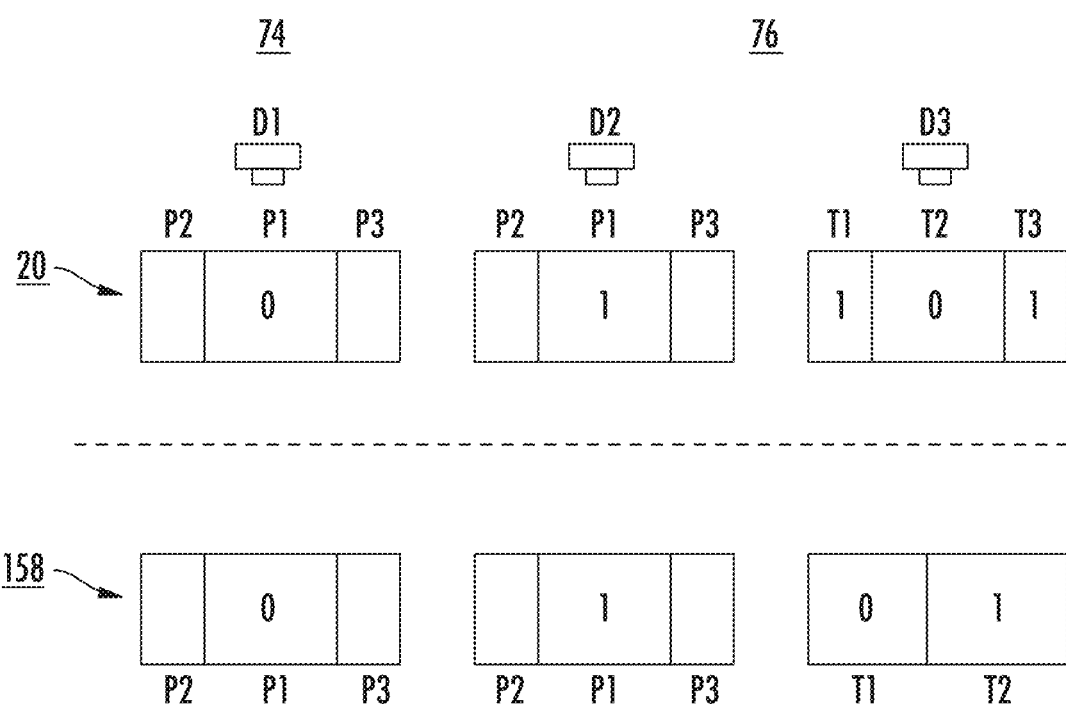
FIG. 8 is a schematic diagram showing bit values for the detectors in the quantum communications system of FIG. 7 and comparing a conventional QKD system and the quantum communications system of FIG. 7.

A comparison can be made between the quantum communications system 20 and its time and phase bins for detectors D1, D2 and D3 in FIG. 8 and indicated by reference numeral 20, and a conventional QKD system referenced by numeral 158. For the phase basis measurement at the phase detector 76 and its detectors D1 and D2, a recorded event in the central time window of detectors D1 or D2 reveals the associated bit value of the photon. For the conventional QKD system 158, the path length difference $\tau_p$ of a Mach-Zender interferometer that is typically used with the system 20, and shown diagrammatically at 160 in FIG. 7 at the phase detector 76, is the size of the time bin spacing $\tau$. In operation of the quantum communications system 20, it is the size of the central time spacing $\tau$, which for the d=2 case, is also the half width of a temporal waveguide.

Associated bit values for the phase detector 76 and its detectors D1 and D2, and the time basis single photon detector 74 and its detector D3, are shown diagrammatically in FIG. 8 based on the arrival times of the photon for the quantum communications system 20 and for the conventional QKD system 158. For the phase basis, the arrival time bins are designated P2, P1, and P3. The center bin P1 gives reliable information about the state. For the time basis, the arrival time bins are designated T1 and T2 for the conventional QKD system 158, and T1, T2, and T3 for the quantum communications system 20. Each arrival time yields important data about the associated bit value.

Phase basis measurements may be performed by passing the single photon state through the Mach-Zehnder interferometer 160 (FIG. 7), which has a delay set by the time bin width of a protocol for the conventional QKD system 158 or a half width of the waveguide for the quantum communications system 20. Single photon interference occurs in a central time window, which the two outputs of the Mach-Zehnder interferometer 160 resolve constructively or destructively depending on the eigenstate of the phase basis that was received. For example, if phase state $|\Psi\rangle$ was sent with an associated bit value 0, the phase detector 76 would yield a detection event for P1 on Detector 1, and no detection event on P1 of Detector 2 (FIG. 8). The time-phase basis QKD is only 1/d efficient for detection in the phase basis, where "d" is the dimensionality of the data structure, i.e., there are two states in each basis, d=2. Thus, there is a non-zero probability amplitude of a detection event in the other arrival time bins (P2 and P3) for both of detectors D1 and D2 in the phase basis. However, detection events in these time bins do not help discriminate between the two states, and so they are not used to make state determinations, e.g., only the central time bins "P1" are used. This measurement inefficiency means a lower key transfer rate (per photon transmitted), but does not negatively impact QBER since these inconclusive non-central-time-bin results are discarded and not used for checking the QBER.

Referring again to FIG. 7 and the description relative to the bins shown in FIG. 8, further details of the re-imaging and detection of the four states in the protocol are explained with description of both temporal and phase information in the re-imaging process. For example, if Alice 26 sends a 1 in the time basis, by generating the single photon wave function $|\Psi\rangle$ and using the Talbot effect where Bob 28 is positioned at the re-imaging point as the Talbot effect image position 40 (FIG. 1), and if Bob chooses to measure in the time basis, Bob will detect a photon arriving in either the T1 or T3 window and the wave function will collapse into one of these measurement bins. For a detection event in either T1 or T3, the associated bit value is 1. Thus, if Bob 28 chooses the same basis that Alice 26 prepared the photon in, Bob will retrieve the correct bit value for that measurement. However, if Bob 28 chooses to measure in the phase basis, and Bob looks for a detection event within the time window P1 on both detectors D1 and D2 at the phase detector 76, Bob will collapse the single photon wave function to either one of those two states, with equal probability. Thus, Bob 28 will have a 50% chance of measuring a bit value of 1, and a 50% chance of measuring a bit value of 0 if Bob measures in a different basis than the one that Alice 26 initially prepared the state in.

If Alice 26 sends a 0 in the time basis, by generating the single photon wave function $|\Psi\rangle$ and using the Talbot effect where Bob 26 is positioned at the Talbot effect image position 40 (FIG. 1), and if Bob 28 chooses to measure in the time basis using detector D3 at the single photon detector 74, Bob will detect a photon arriving in the T2 window. For a detection event in the T2 window, the associated bit value is 0. Thus, if Bob 28 chooses the same basis that Alice 26 prepared the photon in, Bob will retrieve the correct bit value for that measurement. However, if Bob 28 chooses to measure in the phase basis using detectors D1 and D2 at the phase detector 76, and Bob looks for a detection event in the time window P1 on either detector D1 and D2, Bob will collapse the single photon to either one of those two bins, with equal probability. As the system is 1/d efficient, Bob also has a 50% chance of measuring a photon event outside of time window P1 on detectors D1 or D2 at the phase detector 76. Thus, assuming Bob 28 registers a photon event on P1, Bob will have a 50% chance of measuring a bit value of 1, and a 50% chance of measuring a bit value of 0 if Bob measures in a different basis than the one that Alice 26 initially prepared the state in.

If Alice 26 sends a 1 in the phase basis, by generating the single photon wave function $|\Psi\rangle$ and using the Talbot effect where Bob 28 is positioned at the Talbot effect image position 40, and if Bob chooses to measure in the time basis, Bob will have 50% probability of the collapsed state appearing in T1 or T3, or a 50% probability of the collapsed state appearing in T2. Thus, if Bob 28 chooses the opposite basis that Alice 26 prepared the state in, Bob will have a 50% chance of measuring a bit value of 1, and a 50% chance of measuring a bit value of 0. However, if Bob 28 chooses to measure in the phase basis, and Bob looks for a detection event in the time window P1 on either detector D1 and D2 at the phase detector 74, due to single photon interference from the Mach-Zehnder device 160 (FIG. 1), Bob will have a 100% chance of measuring a photon on D2, and thus measuring the correct associated bit value of 1, provided that a photon is detected in time window P1, but inconclusive if the photon is detected in P2 or P3.

If Alice 26 sends a 0 in the phase basis, by generating the single photon wave function $|\Psi\rangle$ and using the Talbot effect where Bob 28 is positioned at the midpoint of the Talbot effect image position 42 in FIG. 1, and if Bob chooses to measure in the time basis, Bob will have 50% probability of the collapsed state appearing in T1 or T3, or a 50% probability of the collapsed state appearing in T2. Thus, if Bob 28 chooses the opposite quantum basis that Alice prepared the state in, i.e., the flipped basis protocol, Bob will have a 50% chance of measuring a bit value of 1, and a 50% chance of measuring a bit value of 0. However, if Bob 28 chooses to measure in the phase basis, and Bob looks for a detection event in the time window P1 on either detector D1 and D2 at the phase detector 74, due to single photon interference from the Mach-Zehnder device 160, Bob 28 will have a 100% chance of measuring a photon on D1, and thus measuring the correct associated bit value of 0 provided that a photon is detected in time window P1, and not in P2 or P3.

Single photon interference impacts the probability distribution functions of each state as a function of the distances along the public section of the quantum communications channel 30. The probability distribution function of the single photon evolves as it propagates down the quantum communications channel 30 due to single photon interference from the interference of virtual images of the initial state created from reflections off the waveguide boundaries as, for example, a single mode optical fiber 36. The information available to Eve 136 by making measurements in the same bases that Alice 26 and Bob 28 are preparing and detecting states in, will be reduced, as the probability amplitude of the state at any point in the link, other than the initial and final positions where Alice 26 and Bob 28 are located, respectively, will be a superposition of the eigenstates of the system, with evolving non-zero probability amplitudes. For example, if Alice 26 has revealed during the key sifting process that Alice prepared a state in the time basis, the wave function of that state, $\psi(z)$ at the location z in the link may correspond to:

$$|\Psi(z)\rangle = a_0(z)|\Psi_{t0}\rangle + a_1(z)|\Psi_{t1}\rangle$$

where the probability amplitudes can be complex valued. The probability of Eve 136 measuring the state $\Psi(z)$, in either basis, and recovering the original state that was sent may be calculated. It should be understood that Eve's position is arbitrary. Assuming that Eve 136 mid-link has excellent information about the location of the link she is measuring, as well as the four states that Alice 26 and Bob 28 are exchanging, and that the evolutions of those states can also be calculated, then the probabilities that Eve mid-link can gain information about a state after the sifting process for states where Alice, Bob, and Eve are measuring in the ideal bases can be represented in various examples as explained below.

If Alice 26 prepared a state in the time basis, e.g., $\Psi(0)$ is $\Psi_{t0}$ or $\Psi_{t1}$, and Eve 136 measures in the time basis, the probability that a measurement in the time basis reflects the correct initial state, e.g., that $\Psi(z)$ is either $\Psi_{t1}$ or $\Psi_{t1}$, can be calculated as:

$$P(\Psi(z)|\Psi_{t1})_{TIME} = [P(\Psi(z)|T1) + P(\Psi(z)|T3)] * \left[\frac{[P(\Psi_{t1}|T1) + P(\Psi_{t1}|T3)]}{P(\Psi_{t1}|T1) + P(\Psi_{t1}|T3) + P(\Psi_{t0}|T1) + P(\Psi_{t0}|T3)}\right] + \left[P(\Psi(z)|T2)*\left[\frac{[P(\Psi_{t1}|T2)]}{P(\Psi_{t1}|T2) + P(\Psi_{t0}|T2)}\right]\right.$$

$$P(\Psi(z)|\Psi_{t0})_{TIME} = \left[P(\Psi(z)|T1) + P(\Psi(z)|T3)\right]*\left[\frac{[P(\Psi_{t0}|T1) + P(\Psi_{t0}|T3)]}{P(\Psi_{t1}|T1) + P(\Psi_{t1}|T3) + P(\Psi_{t0}|T1) + P(\Psi_{t0}|T3)}\right] + \left[P(\Psi(z)|T2)*\left[\frac{[P(\Psi_{t0}|T2)]}{P(\Psi_{t1}|T2) + P(\Psi_{t0}|T2)}\right]\right.$$

If Alice 26 prepared a state in the time basis, e.g., $\Psi(0)$ is $\Psi_{t0}$ or $\Psi_{t1}$, and Eve 136 measures in the phase basis, the probability that a measurement in the phase basis reflects the correct initial state, e.g. that $\Psi(z)$ is either $\Psi_{t1}$ or $\Psi_{t1}$, can be calculated as:

$$P(\Psi(z)|\Psi_{t1})_{PHASE} = [P(\Psi(z)|P1)_{D1}]*\left[\frac{[P(\Psi_{t1}|P1)_{D1}]}{P(\Psi_{t1}|P1)_{D1} + P(\Psi_{t0}|P1)_{D1}}\right] + \left[P(\Psi(z)|P1)_{D2}]*\left[\frac{[P(\Psi_{t1}|P1)_{D2}]}{P(\Psi_{t1}|P1)_{D2} + P(\Psi_{t0}|P1)_{D2}}\right]\right.$$

$$P(\Psi(z)|\Psi_{t0})_{PHASE} = [P(\Psi(z)|P1)_{D1}]*\left[\frac{[P(\Psi_{t0}|P1)_{D1}]}{P(\Psi_{t1}|P1)_{D1} + P(\Psi_{t0}|P1)_{D1}}\right] + \left[P(\Psi(z)|P1)_{D2}]*\left[\frac{[P(\Psi_{t0}|P1)_{D2}]}{P(\Psi_{t1}|P1)_{D2} + P(\Psi_{t0}|P1)_{D2}}\right]\right.$$

If Alice 26 prepared a state in the phase basis, e.g., $\Psi(0)$ is $\Psi_{f0}$ or $\Psi_{f1}$, and Eve 136 measures in the phase basis, the probability that a measurement in the phase basis reflects the correct initial state, e.g. that $\Psi(z)$ is either $\Psi_{f1}$ or $\Psi_{f0}$, can be calculated as:

$$P(\Psi(z)|\Psi_{f1})_{PHASE} = [P(\Psi(z)|P1)_{D1}]*\left[\frac{[P(\Psi_{f1}|P1)_{D1}]}{P(\Psi_{f1}|P1)_{D1} + P(\Psi_{f0}|P1)_{D1}}\right] + \left[P(\Psi(z)|P1)_{D2}]*\left[\frac{[P(\Psi_{f1}|P1)_{D2}]}{P(\Psi_{f1}|P1)_{D2} + P(\Psi_{f0}|P1)_{D2}}\right]\right.$$

$$P(\Psi(z)|\Psi_{f0})_{PHASE} = [P(\Psi(z)|P1)_{D1}]*\left[\frac{[P(\Psi_{f0}|P1)_{D1}]}{P(\Psi_{f1}|P1)_{D1} + P(\Psi_{f0}|P1)_{D1}}\right] + \left[P(\Psi(z)|P1)_{D2}]*\left[\frac{[P(\Psi_{f0}|P1)_{D2}]}{P(\Psi_{f1}|P1)_{D2} + P(\Psi_{f0}|P1)_{D2}}\right]\right.$$

If Alice 26 prepared a state in the phase basis, e.g., $\Psi(0)$ is $\Psi_{t0}$ or $\Psi_{t1}$, and Eve 136 measures in the time basis, the probability that a measurement in the time basis reflects the correct initial state, e.g. that $\Psi(z)$ is either $\Psi_{t1}$ or $\Psi_{t1}$), can be calculated as:

$$P(\Psi(z)|\Psi_{f1})_{TIME} = \left[P(\Psi(z)|T1) + P(\Psi(z)|T3)\right]*\left[\frac{[P(\Psi_{f1}|T1) + P(\Psi_{f1}|T3)]}{P(\Psi_{f1}|T1) + P(\Psi_{f1}|T3) + P(\Psi_{f0}|T1) + P(\Psi_{f0}|T3)}\right] + \left[P(\Psi(z)|T2)*\left[\frac{[P(\Psi_{f1}|T2)]}{P(\Psi_{f1}|T2) + P(\Psi_{f0}|T2)}\right]\right.$$

-continued $$P(\Psi(z)|\Psi_{f0})_{TIME} = [P(\Psi(z)|T1) + P(\Psi(z)|T3)] * \left[ \frac{[P(\Psi_{f0}|T1) + P(\Psi_{f0}|T3)]}{P(\Psi_{t1}|T1) + P(\Psi_{t1}|T3) + P(\Psi_{t0}|T1) + P(\Psi_{t0}|T3)} \right] + \left[ P(\Psi(z)|T2)] * \left[ \frac{[P(\Psi_{f0}|T2)]}{P(\Psi_{f1}|T2) + P(\Psi_{f0}|T2)} \right] \right]$$

Figure 9B:
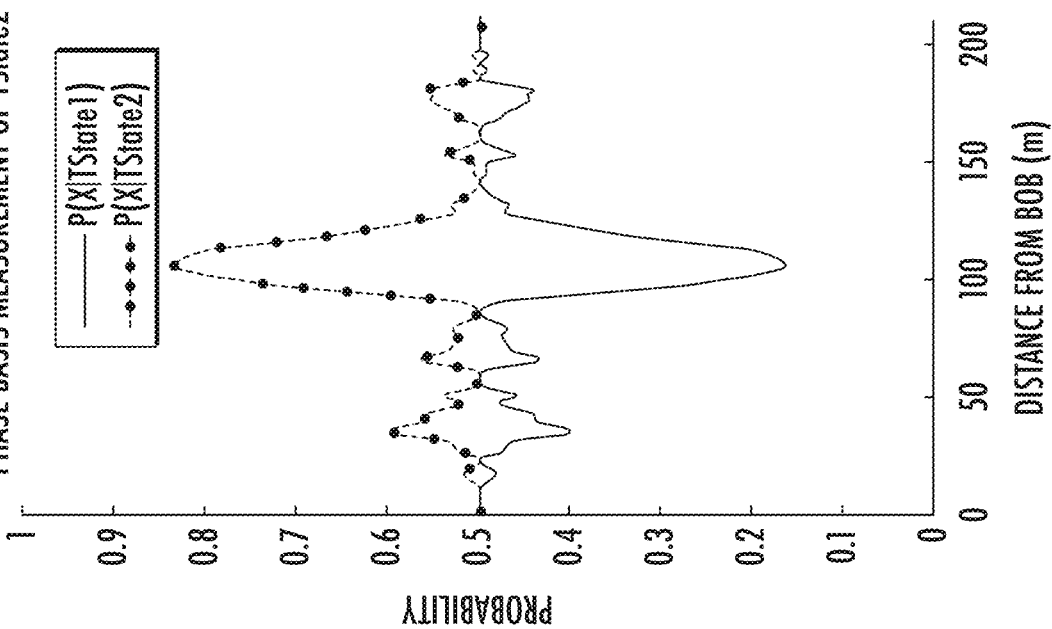
FIG. 9B is a graph showing phase basis measurements and the probability of detection versus distance for the quantum communications system of FIG. 1.
Figure 9A:
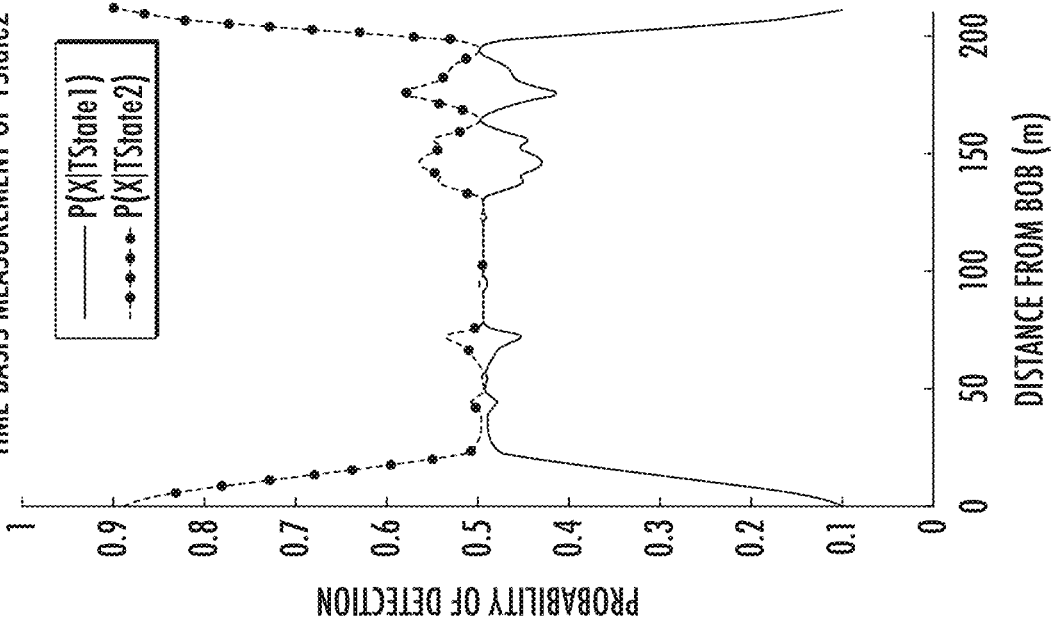
FIG. 9A is a graph showing time basis measurements and the probability of detection versus distance for the quantum communications system of FIG. 1.

For example, if Bob 28 and Eve 136 know that Alice 26 sent a bit of information in the time basis, the probabilities of both gaining information about the state Alice sent when measuring in either the time or the phase basis can be determined, such as using the quantum communications system of FIG. 1. Thus, if Alice 26 sends $\Psi_{t1}$ and Bob 28 or Eve 136 measures in the time basis, or the phase basis, probabilities may be obtained as shown in the graphs of FIGS. 9A and 9B, both graphs showing probability of detection on the vertical axis of 0 to 1.0 and the distance from Bob in meters. The time basis of measurement is shown in FIG. 9A and the phase basis of measurement is shown in FIG. 9B. The probability of the two time states 1 and 2 are shown for the time basis (FIG. 9A) and phase basis (FIG. 9B). The Time State 2 is shown by the upper dotted line. It should be understood that time states are labeled as "1" and "2," whereas in FIG. 6, they are labeled as "0" and "1."

When Bob 28 is at the Talbot image point as the Talbot effect image position 40 in the quantum communications system 20, i.e., where the distance from Bob is 0 meters, the state that Alice 26 sent in the time basis is imaged at Bob's location, and thus, correctly detected by Bob, for example, as shown at FIG. 9A, showing the time basis measurement of Tstate2 with a high probability of detection at about 0.9. At one-half distance of the Talbot effect image position, i.e., the midpoint of the Talbot effect image position 42 in FIG. 1, and midpoint as distance from Bob, the initial state $\Psi_{t1}$ evolves to $\Psi_{f1}$, and thus, a phase basis measurement at this location (FIG. 9B) can be used to distinguish between the two eigenstates in the time basis which are transformed into eigenstates in the phase basis, whereas a time basis measurement at this location cannot. Thus, if Eve 136 knew this location, e.g., at 110 m from Bob 28 as shown in FIG. 9B, showing the phase basis measurement of Tstate2, and the knowledge of how states transformed as a function of distance, Eve may know that measurements made in the opposite basis from the one that Alice 26 prepared the state in, would yield information about the state. Then, in an intercept-resend attack, Eve 136 could resend the associated bit value to Bob 28 in the opposite basis from the one Eve measured in, e.g., in the same basis that Alice 26 prepared the state in. Thus, in this flipped basis intercept-resend attack, Eve 136 could gain information about the system, if Eve positioned herself at one-half of the Talbot distance corresponding to the midpoint of the Talbot effect image position 42 in FIG. 1, and measured in the opposite basis from the one Alice 26 originally prepared the state in. If Alice 26 sends $\Psi_{t1}$ and both Bob 28 located at the Talbot effect image position 40 and Eve 136 is located anywhere else in the communications link know that Alice sent in the time basis, the probabilities of them detecting each eigenstate of the time basis when measuring in either the time basis, or the phase basis, are illustrated in FIGS. 9A and 9B when the quantum communications system 20 of FIG. 1 is used.

Figures 10A, 10B:
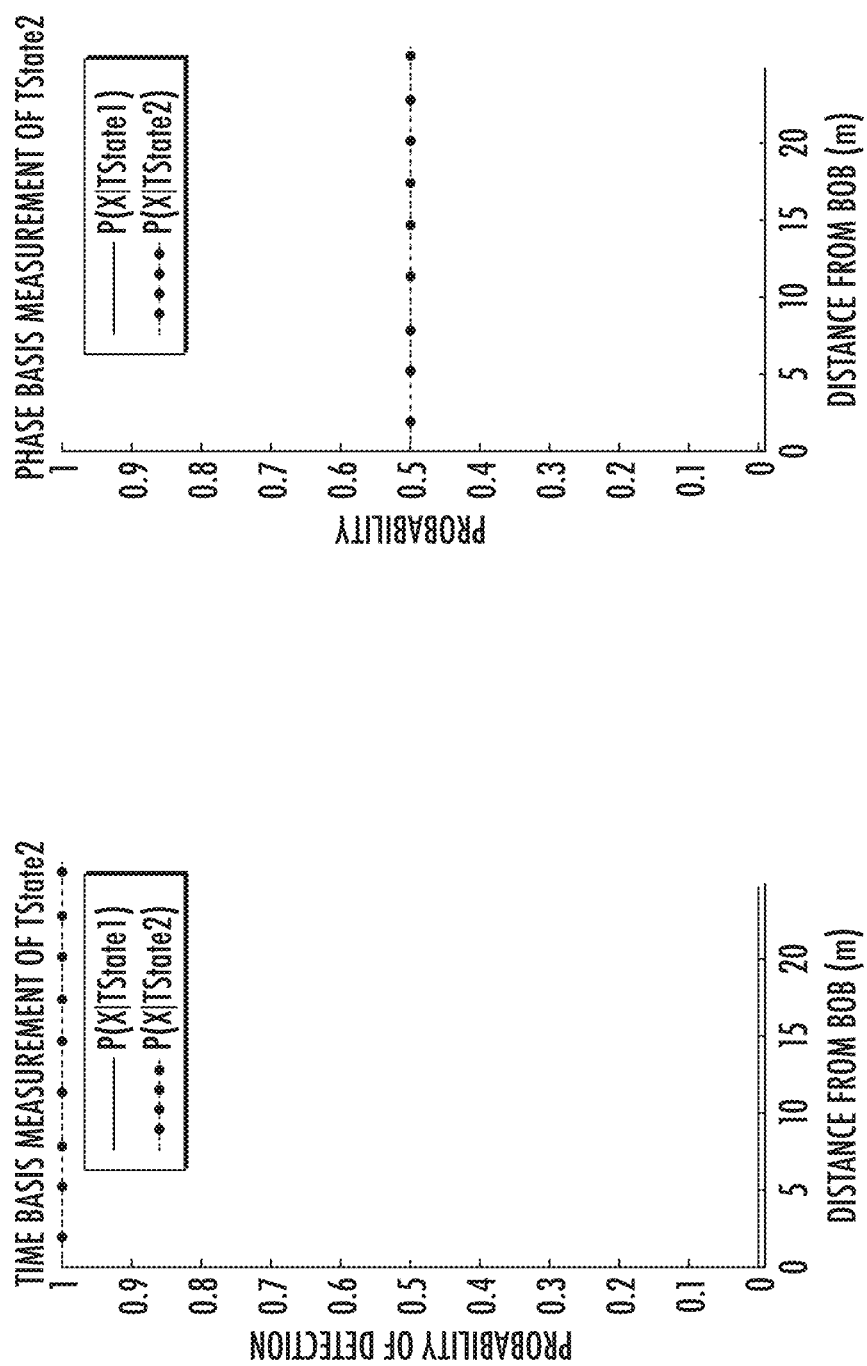
FIG. 10A is a graph showing the time basis measurements and the probability of detection versus distance in a conventional QKD system.
FIG. 10B is a graph showing the phase basis measurements and the probability of detection versus distance in a conventional QKD system.

The results shown in FIGS. 9A and 9B can be contrasted with the results shown in the graphs of FIGS. 10A and 10B, where results are shown for a conventional QKD system 158 as described before and not the quantum communications system 20 of FIG. 1. If Alice 26 sends $\Psi_{t1}$ and both Bob 28 located at the Talbot image point corresponding to the Talbot effect image position 40, and Eve 136 is located anywhere else in the public section of the quantum communications channel 30, and knows that Alice 26 sent in the time basis, the probabilities of them detecting each eigenstate of the time basis when measuring in either the time basis, or the phase basis, are illustrated. In order to bypass this security issue and turn it into a security asset, if Bob 28 chooses to measure at one-half of the Talbot distance corresponding to the midpoint of the Talbot effect image position 42 of FIG. 1, instead of at the image point 40 itself, the new flipped basis protocol may be established for which the secret cryptographic key is distilled from bit measurements made by Alice 26 and Bob 28 in opposite quantum bases from each other, rather than in the same quantum basis as with a more conventional QKD system is used. As a result, by measuring when Bob 28 at the midpoint of the Talbot effect image position 42, it is possible to employ the flipped basis QKD protocol using the quantum communications system 20 of FIG. 1.

Figures 11A, 11B:
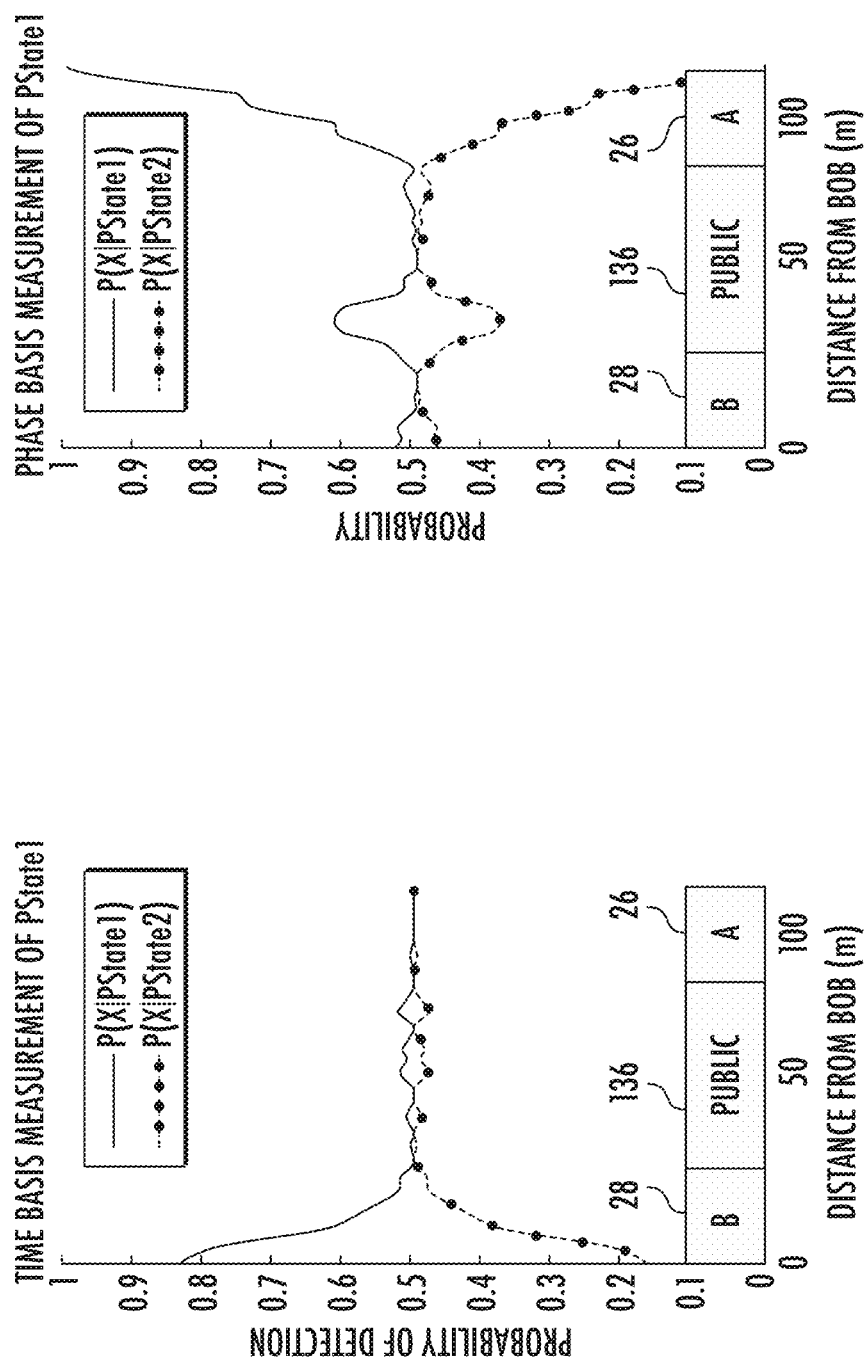
FIG. 11A is another graph showing time basis measurements and the probability of detection versus distance for the quantum communications system of FIG. 1.
FIG. 11B is another graph showing phase basis measurements and the probability of detection versus distance for the quantum communications system of FIG. 1.
Figure 12B:
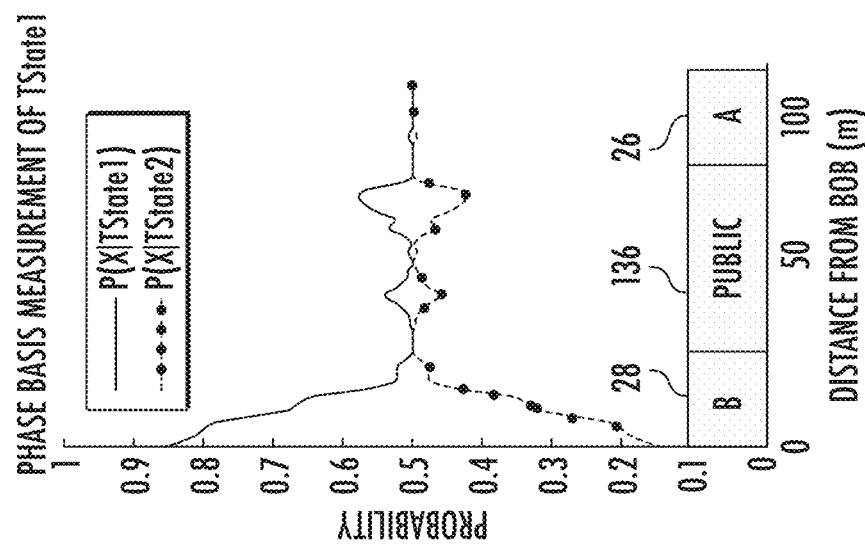
FIG. 12B is another graph showing phase basis measurements and the probability of detection versus distance for the quantum communications system of FIG. 1.
Figure 12A:
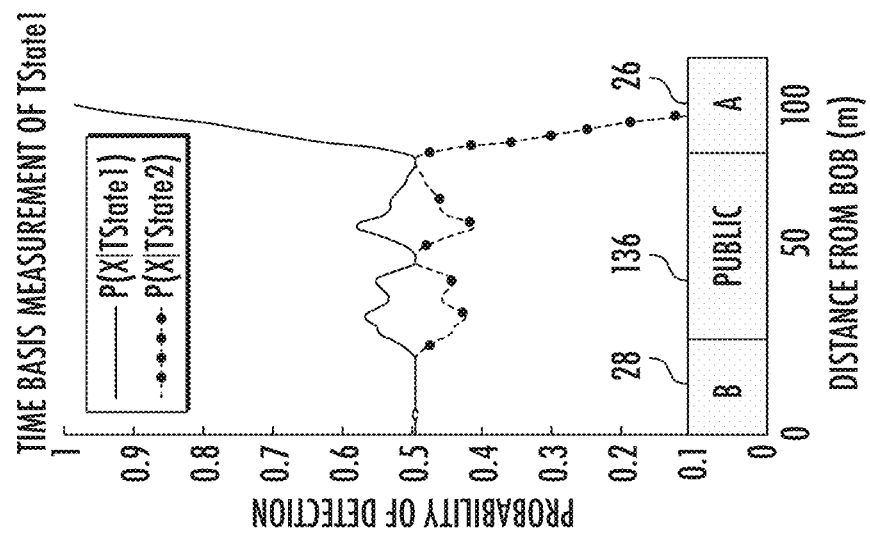
FIG. 12A is another graph showing the time basis measurements and the probability of detection versus distance for the quantum communications system of FIG. 1.

Referring now to FIGS. 11A, 11B, 12A, and 12B, probabilities of detection for each of the four states in the protocol where Bob 28 is positioned at about one-half, i.e., the midpoint of the Talbot effect image position 42 are explained, and showing a phase state 1 and time and phase measurements (FIGS. 11A and 11B) and time state 1 and time and phase measurements (FIGS. 12A and 12B). The "Public" section is where Eve 136 may be located and has access along the quantum communications channel 30 and is reduced to a random guess for each the four states in the protocol, regardless of which basis the state is measured in. For purposes of description, the public link is given the reference numeral 136 corresponding to where Eve may be located. With measurements made in the same two bases that Alice prepared the states in, Bob 28 would have more information than Eve 136, even if they could both choose which basis they wanted to measure in.

All four graphs in 11A, 11B, 12A, and 12B show the probability of detection on the vertical axis and distance from Bob 28 in meters. FIG. 11A shows the results for both the time measurements of Phase State 1 and Phase State 2 and FIG. 11B shows the results as similar for the phase basis measurement of Phase State 1 and Phase State 2. As noted before, it should be understood that time states are labeled as "1" and "2," whereas in FIG. 6, they are labeled as "0" and "1." FIGS. 12A and 12B show the respective time states as Tstate1 and Tstate2.

The probability of correlating a detector measurement in the time or phase bases, with the initial state $\Psi F_{f0}$ (Phase State 1), as a function of link distance is illustrated in FIGS. 11A and 11B. "B" denotes Bob's 28 private length of fiber and "A" denotes Alice's 26 private length of fiber, and "Public" represents the fiber link that is accessible to Eve 136. The Phase State 1 is shown by the dotted solid line and the Phase State 2 is shown by the solid line.

The graphs of FIGS. 11A and 11B also show the probability of correlating a detector measurement in the time or phase bases, with the initial state $\Psi_{f1}$ (Phase State 2), as a function of link distance, and represented by the same graphs of FIGS. 11A and 11B, but the dotted solid line and solid lines would be reversed.

The probability of correlating a detector measurement in the time or phase bases, with the initial state $\Psi_{t0}$ (Time State 1), as a function of link distance is shown in the graphs of FIGS. 12A and 12B. "B" denotes Bob's 28 private length of fiber, "A" denotes Alice's 26 private length of fiber, and "Public" represents fiber link that is accessible to Eve 136.

FIGS. 12A and 12B also represent the probability of correlating a detector measurement in the time or phase bases, with the initial state $\Psi_{t1}$ (Time State 2), as a function of link distance, and represented by the same graphs, but the lines would be reversed.

A performance comparison between the flipped basis protocol used in the quantum communications system 20 of FIG. 1 when Bob 28 is located at the midpoint of the Talbot effect image position 42 and a conventional time-phase bin protocol for a conventional QKD system 158 was conducted. It was assumed that when Bob 28 has a perfect measurement system, and when Eve 136 is not present, the QBER is 0. The QBER represents the bit errors in the sifted data stream.

In a conventional QKD system 158, where Bob 28 measures in the same basis as Alice 26 prepared the bit in, Bob will retrieve the associated bit value. In the flipped basis protocol in accordance with the quantum communications system 20 of FIG. 1, where Bob 28 measures in the opposite basis as the one Alice 26 prepared the bit in, Bob will retrieve the associated bit value, assuming that the probability of detection can be increased from 0.85 to 1. By optimizing the temporal waveguide boundaries, it is assumed that the probability of detection can be increased from 0.85 to 1. However, if Eve 136 is present, Eve will introduce errors into the bit stream. For example, in both a conventional QKD system 158 and the quantum communications system 20 using the flipped basis protocol, Eve 136 has a 50% chance of choosing the correct basis to measure in. If Eve 136 chooses the correct basis in a conventional QKD system 158, Eve has a 100% chance of correctly measuring and then, in an intercept-resend attack, introducing the correct state into the bit stream without Bob 28 noticing. If Eve 136 chooses the wrong basis, Eve will collapse the state into an eigenstate of the basis Eve is measuring in, and then, upon reintroduction, will cause Bob 28 to correctly measure the state that Alice 26 originally sent, with 50% probability. Thus, if Eve is present, Bob 28 will measure the same bits that Alice 26 sent 75% of the time, resulting in a QBER of one-fourth.

In the flipped basis protocol using the quantum communications system 20 of FIG. 1, when Bob is at the midpoint 142 of the Talbot effect image position, if Eve 136 chooses the same basis as Alice 26 instead of the opposite basis, Eve will still cause the probability of detection by Bob 28 to drop to 50%. This is identical to the case in a conventional QKD system 158. However, if Eve 136 chooses to measure in the opposite basis, the basis that Bob 28 measures in to gain information about the state, Eve will cause Bob's probability of detection to drop to 50%, as Eve cannot gain information about the state, at least in the two bases that Alice 26 and Bob are using. Thus, Eve 136 reduces the overall percentage of bits that Bob 28 and Alice 26 both agree upon, from 75% to 50%. Thus, the QBER for Bob 28 in the flipped basis d=2 protocol, is QBER=0.5.

The n-dimensional case is an extension of the d=2 case, and is based on generalizing the performance of the d=2 case, as well as preliminary simulations which suggest that the information content available to Eve 136, decreases as $1/n$ as the dimensionality "n" of the data structure increases. With these assumptions, the QBER for the flipped basis protocol using the quantum communications system 20 of FIG. 1 approaches 1, as d approaches infinity. Thus, the flipped basis protocol provides a potential 100% visibility for an intercept-resend attack if Eve 136 tries to measure in one of the two infinite-dimensional bases that Alice 26 and Bob 28 are using for the protocol. The number of mutually unbiased bases that are available for Eve 136 to measure in, increases as the dimensionality of the data structure "d" increases (e.g., for a d=2 case, there are 3 MU bases that are available), and thus, it is possible that Eve may gain further information about the state by choosing to measure in a different basis from the ones that Alice 26 and Bob 28 are preparing and measuring bits in.

Table I below illustrates the performance comparison between a conventional QKD system 158 (SOA) and the proposed flipped basis protocol used by the quantum communications system 20 of FIG. 1. The optimized QBER represents the measured errors in the bit stream after sifting. It is assumed that Bob 28 has a perfect measurement system and after that sifting, if Eve 136 is not present, the QBER is 0. However, if Eve 136 is present, errors will be introduced into the bit stream. It is also assumed that the flipped basis probability of detection in the optical basis can be further optimized from 0.85 to 1. The estimates for the "n" dimensional QBER are derived based on performance trends seen in the d=2 case, which shows that quantum states are reduced to a random guess for Eve and simulations which show that as "d" increases, the information available to Eve decreases, if she is measuring in the same two bases that Alice is initially preparing states in.

TABLE I

| | SOA (d = 2) | SOA | Flipped Basis (d = 2) | Flipped Basis (d = n) |
|---|---|---|---|---|
| Optimized QBER without Eve | 0 | 0 | 0 | 0 |
| Optimized QBER with Eve | ¼ | $\frac{1}{2} * \left(1 - \frac{1}{n}\right)$ | ½ | $\left(1 - \frac{1}{n}\right)$ |

By providing a potential mechanism to increase the sensitivity of the QBER to Eve's presence by double, the flipped basis protocol using the quantum communications system 20 of FIG. 1 can use this increased sensitivity to provide secure cryptographic key transmission. If the sensitivity of QBER to Eve's presence is higher in the flipped basis protocol, the threshold QBER for distilling a secret key with a net positive secure cryptographic key rate may increase.

As the QBER threshold increases, restrictions on certain system parameters can be reduced. For instance, chip based systems are attractive for SWaP considerations, and for robust implementation in the field, but they are inherently lossy. Transferring light from chip to fiber, and back again, is a lossy process, that can preclude the use of attractive chip based architectures outside of ideal laboratory environments. By increasing the QBER threshold using the quantum communications system 20 of FIG. 1, it is possible to use more effectively chip based sources and optical detectors for QKD, as the protocol can tolerate twice as much loss, and as such, will likely have at least a double higher QBER threshold than conventional QKD protocols.

Another impact of increasing the QBER threshold is that the flipped basis protocol as described could potentially allow the quantum communications system 20 to be more easily and readily employed in lossy field applications, which could, for instance, require real time tracking of Bob 28, which may be an inherently lossy process.

Figure 13:
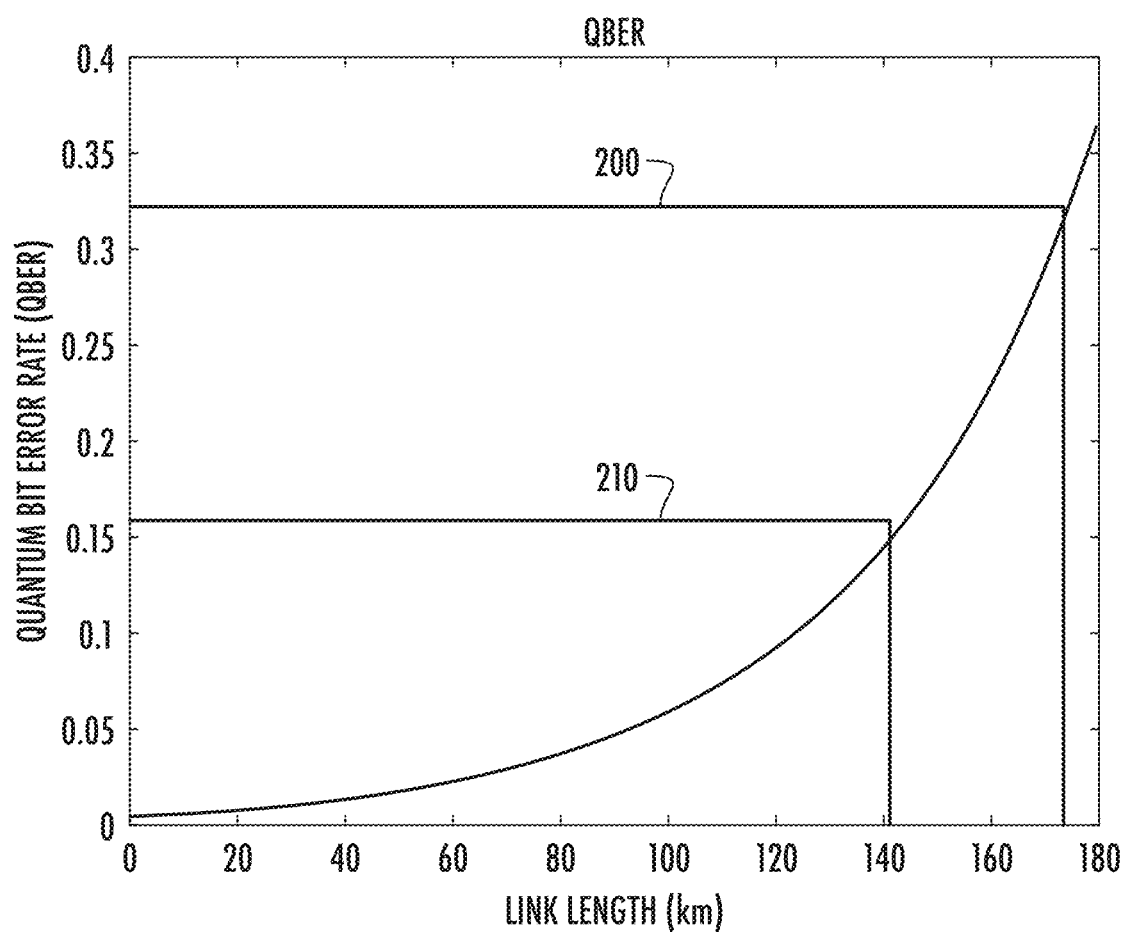
FIG. 13 is a graph showing QBER versus link length in a conventional QKD system and the quantum communication system of FIG. 1.

By increasing the threshold QBER, Bob 28 and Alice 26 may communicate over longer quantum communications channel 30. Because part of the QBER is related to communication link loss as the link loss increases due to material absorption and the subsequent increased probability of annihilating a photon the further it travels down an optical link, the QBER increases. By increasing the QBER threshold, it is possible to use this additional loss tolerance with longer communication links as shown in the graph in FIG. 13, showing at 200 the threshold results using the flipped basis protocol in the quantum communications system 20 versus the threshold results at 210 of a conventional QKD system 158. A potential 20% increase in secure communication link lengths for the quantum communications channel 30 can potentially be achieved with the flipped basis protocol as described. In FIG. 13, the QBER (vertical axis) as a function of link length (horizontal axis) for a conventional QKD system 158 and its QBER threshold is shown at 210, versus the QBER threshold shown at 200 for the flipped basis protocol of the quantum communications system 20. As can be seen, the flipped basis protocol using the quantum communications system 20 can operate at a higher QBER, which allows for at least about 20% longer secure communication links.

In the spatial domain, e.g., when spatially modulated photons are transmitted over multi-mode fiber 38 as the waveguide, single photon interference and Talbot re-imaging may be driven by diffraction within the multi-mode fiber as the waveguide. The description so far has primarily concerned temporal waveguides created by two co-propagating pump pulses imparting XPM on a single photon, and dispersion of the single photon to drive the single photon interference. There are several practical advantages to using a spatial waveguide, such as multi-mode fiber 38, to provide the reflective boundaries required for single photon interference. For example, the ease of experimental implementation favors spatial waveguides. Further, the cost of implementation is expected to be reduced as it would not necessarily require the use of a mode-locked laser source. A reformulation of basis states in space/spatial phase rather than time/phase would be employed and an analogue detection architecture could be employed.

It is possible to determine the security impacts of measurements made in a third mutually unbiased basis. For a d=2 protocol, there are three mutually unbiased bases in which qubits can be represented. The practice of using two bases to prepare and measure information has been adopted, such as BB84 protocol. However, as noted above, Eve's 136 information about the state that Alice 26 sent is reduced to a random guess in both bases and it may be possible that the third mutually unbiased basis could reveal more information about the state than a measurement in the two bases that Alice and Bob 28 are using. Further, as it appears that the initial state is transformed from an eigenstate of one basis, to the corresponding eigenstate of the other basis, at one-half the Talbot re-imaging corresponding to the midpoint at the Talbot effect image position 42, there may be positions along the public section of the quantum communications channel 42 where the initial state is transformed into an eigenstate of the third mutually unbiased basis. The flipped basis protocol may be tailored to serve as a benefit rather than a security loophole for Eve, e.g., the link distance that Bob 28 positions the receiver node could change from one-half the Talbot distance to perhaps one-fourth of the Talbot distance.

By adjusting the temporal spacing between pump pulses, and the pulse width of the pump pulses in the temporal waveguides such as single mode fiber 36, or the core size of the multi-mode fiber 38, it may be possible to identify an optimal design, e.g., maximum bit rate and maximum communications link. Further, temperature variations, core size variations, and bending radius may impact the performance of the protocol, which will help determine parameters for effective field use.

For the four states of a d=2 space/phase protocol, it is possible to generate each of these states with a spatial light modulator, and send each state through a multi-mode optical fiber 38, where the spatial and phase information of the state would be directly measured, and also measured with the space and phase detection architectures required for QKD. At the Talbot effect image position 40, there is almost perfect reimaging of the initial eigenstate, and at one-half the Talbot distance corresponding to the midpoint 42, there is a transformation of the state to the corresponding eigenstate of the second basis.

It is evident that the quantum communications system 20 provides single photon self-interference, achieved through the quantum Talbot effect, as a physical layer of security for boosting performance metrics in quantum communication links. The quantum Talbot effect may be used in QKD systems and the flipped basis protocol is advantageous to enhance security. The protocol may offer performance enhancements over conventional QKD prepare and measure approaches, providing twice the increase in the QBER threshold, which could enable implementations in lossy and highly contested communication links where current QKD systems cannot currently operate. Additionally, the quantum communications system 20 could more readily enable QKD using on chip integrated sources and detection architectures that generally incur more losses than their free space counterparts, and could also potentially enable up to 20% longer secure communication links by providing an anticipated at least double increase in the QBER threshold when compared with conventional QKD protocols.

This application is related to copending patent application U.S. Ser. No. 16/668,002, entitled, "QUANTUM COMMUNICATIONS SYSTEM HAVING QUANTUM KEY DISTRIBUTION AND USING A TALBOT EFFECT IMAGE POSITION AND ASSOCIATED METHODS," filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A quantum communications system comprising:
   a communications system; and
   a quantum key distribution (QKD) system operable with the communications system and comprising a transmitter node, a receiver node, and a quantum communications channel coupling the transmitter node and receiver node;
   the transmitter node cooperating with the quantum communications channel defining a Talbot effect image position along the quantum communications channel; and the receiver node being located along the quantum communications channel at a midpoint of the Talbot effect image position.

2. The quantum communications system of claim 1 wherein the transmitter node is configured to generate temporally modulated photons.

3. The quantum communications system of claim 2 wherein the receiver node comprises a phase detector.

4. The quantum communications system of claim 2 wherein the receiver node comprises at least one single photon detector.

5. The quantum communications system of claim 2 wherein the quantum communications channel comprises a single mode optical fiber.

6. The quantum communications system of claim 2 wherein the temporally modulated photons each have a transmitted quantum basis, and said receiver node is configured to sift for bits obtained by measurement in the basis opposite that in which the photon was prepared.

7. The quantum communications system of claim 1 wherein the transmitter node is configured to generate spatially modulated photons.

8. The quantum communications system of claim 7 wherein the quantum communications channel comprises a multi-mode optical fiber.

9. The quantum communications system of claim 7 wherein the spatially modulated photons have a transmitted quantum basis, and said receiver node is configured to sift for bits obtained by measurement in the basis opposite that in which the photon was prepared.

10. The quantum communications system of claim 1 wherein the transmitter node is configured to perform optical polarization encoding.

11. A quantum key distribution (QKD) system comprising:
    a transmitter node, a receiver node, and a quantum communications channel coupling the transmitter node and receiver node;
    the transmitter node cooperating with the quantum communications channel defining a Talbot effect image position along the quantum communications channel; and
    the receiver node being located along the quantum communications channel at a midpoint of the Talbot effect image position.

12. The QKD system of claim 11 wherein the transmitter node is configured to generate temporally modulated photons.

13. The QKD system of claim 12 wherein the receiver node comprises a phase detector.

14. The QKD system of claim 12 wherein the receiver node comprises at least one single photon detector.

15. The QKD system of claim 12 wherein the quantum communications channel comprises a single mode optical fiber.

16. The QKD system of claim 12 wherein the temporally modulated photons each have a transmitted quantum basis, and said receiver node is configured to sift for bits obtained by measurement in the basis opposite that in which the photon was prepared.

17. The QKD system of claim 11 wherein the transmitter node is configured to generate spatially modulated photons.

18. The QKD system of claim 17 wherein the quantum communications channel comprises a multi-mode optical fiber.

19. The QKD system of claim 17 wherein the spatially modulated photons each have a transmitted quantum basis, and said receiver node is configured to sift for bits obtained by measurement in the basis opposite that in which the photon was prepared.

20. The QKD system of claim 11 wherein the transmitter node is configured to perform optical polarization encoding.

21. A method of operating a quantum communications system comprising a communications system and a quantum key distribution (QKD) system operable therewith, the QKD system comprising a transmitter node, a receiver node, and a quantum communications channel coupling the transmitter node and receiver node, the method comprising:
    operating the transmitter node to cooperate with the quantum communications channel to define a Talbot effect image position along the quantum communications channel; and
    operating the receiver node to be located along a midpoint of the quantum communications channel at the Talbot effect image position.

22. The method of claim 21 wherein operating the transmitter node comprises generating temporally modulated photons.

23. The method of claim 22 wherein the receiver node comprises a detector circuit for detecting phase bin states.

24. The method of claim 22 wherein the receiver node comprises at least one single photon detector.

25. The method of claim 22 wherein the quantum communications channel comprises a single mode optical fiber.

26. The method of claim 22 wherein the temporally modified photons each have a transmitted quantum basis, and the receiver node is configured to sift for bits obtained by measurement in the basis opposite that in which the photon was prepared.

27. The method of claim 22 wherein operating the transmitter node comprises generating spatially modulated photons.

28. The method of claim 27 wherein the quantum communications channel comprises a multi-mode optical fiber.

29. The method of claim 27 wherein the spatially modified photons each has a transmitted quantum basis, and the receiver node is configured to sift for bits obtained by measurement in the basis opposite that in which the photon was prepared.

30. The method of claim 22 wherein the transmitter node is configured to perform optical polarization encoding.

* * * * *